(12) United States Patent
Kastler et al.

(10) Patent No.: US 12,109,694 B2
(45) Date of Patent: Oct. 8, 2024

(54) INDUSTRIAL ROBOT

(71) Applicant: Beckhoff Automation GmbH, Verl (DE)

(72) Inventors: Peter Kastler, Vienna (AT); Clemens Maier, Bludenz (AT); Thomas Morscher, Vienna (AT); Armin Pehlivan, Nüziders (AT); Christoph Zech, Moedling (AT); Leo Büchinger, Berndorf (AT); Hans Beckhoff, Verl (DE); Dirk Janssen, Verl (DE); Uwe Prüssmeier, Lemgo (DE); Michael Pfister, Hafenlohr (DE)

(73) Assignee: Beckhoff Automation GmbH, Verl (DE)

( * ) Notice: Subject to any disclaimer, the term of this patent is extended or adjusted under 35 U.S.C. 154(b) by 359 days.

(21) Appl. No.: 17/575,549

(22) Filed: Jan. 13, 2022

(65) Prior Publication Data
US 2022/0134540 A1 May 5, 2022

Related U.S. Application Data

(63) Continuation of application No. PCT/EP2020/070754, filed on Jul. 23, 2020.

(30) Foreign Application Priority Data

Jul. 25, 2019 (DE) ..................... 10 2019 120 131.4

(51) Int. Cl.
*B25J 9/08* (2006.01)
*B25J 9/12* (2006.01)
*B25J 19/00* (2006.01)

(52) U.S. Cl.
CPC .................. *B25J 9/08* (2013.01); *B25J 9/126* (2013.01); *B25J 19/0029* (2013.01)

(58) Field of Classification Search
CPC ........... B25J 9/08; B25J 9/126; B25J 19/0029
See application file for complete search history.

(56) References Cited

U.S. PATENT DOCUMENTS

| 4,319,772 A | 3/1982 | Weirich et al. |
| 4,370,091 A | 1/1983 | Gagliardi |

(Continued)

FOREIGN PATENT DOCUMENTS

| CN | 2735363 Y | 10/2005 |
| CN | 101861234 A | 10/2010 |

(Continued)

OTHER PUBLICATIONS

Office Action dated Jul. 12, 2023 in connection with Chinese patent application No. 202080053383.2, 20 pages including English translation.

(Continued)

*Primary Examiner* — Saul Rodriguez
*Assistant Examiner* — Brendan P Tighe
(74) *Attorney, Agent, or Firm* — Dorsey & Whitney LLP

(57) ABSTRACT

An industrial robot comprises a modular robot arm having a plurality of arm modules, where a rotation transfer device for optical signal transmission is provided in an arm module or between a first and a second arm module. The rotation transfer device comprises an optomechanical rotation interface having a first interface side and a second interface side, which face each other and are substantially rotationally symmetrical and complementary. The first and second interface sides are configured to rotate relative to each other. The first and second interface sides are mechanically mounted with respect to each other, with a radial plain bearing on one interface side and a slide bearing shell complementary thereto on the other interface side. A gap is formed between the first and second interface sides, in the axial direction of (Continued)

the rotation transfer device, across which the optical signal transmission takes place.

18 Claims, 13 Drawing Sheets

(56) References Cited

U.S. PATENT DOCUMENTS

| | | | |
|---|---|---|---|
| 4,438,309 | A | 3/1984 | Zimmer |
| 4,655,655 | A | 4/1987 | Schuerfeld |
| 4,990,839 | A | 2/1991 | Schonlau |
| 5,039,193 | A | 8/1991 | Snow et al. |
| 5,056,829 | A | 10/1991 | Kramer |
| 5,069,524 | A | 12/1991 | Watanabe et al. |
| 5,205,701 | A | 4/1993 | Kigami et al. |
| 5,488,215 | A | 1/1996 | Aronsson |
| 5,633,963 | A | 5/1997 | Rickenbach et al. |
| 5,850,762 | A | 12/1998 | Kochanneck |
| 6,084,373 | A | 7/2000 | Goldenberg et al. |
| 6,628,338 | B1 | 9/2003 | Elberbaum et al. |
| 8,786,385 | B1 | 7/2014 | Lorenc |
| 8,845,338 | B2 * | 9/2014 | Sirkett ............... B25J 15/04 439/15 |
| 8,909,008 | B1 | 12/2014 | Tzeng et al. |
| 8,978,509 | B2 | 3/2015 | Pan et al. |
| 9,677,602 | B1 * | 6/2017 | Baghdasarian ...... B25J 19/0004 |
| 9,751,220 | B2 | 9/2017 | Murphy et al. |
| 9,796,097 | B2 * | 10/2017 | Kirihara .................. B25J 17/02 |
| 10,281,657 | B2 | 5/2019 | Sullivan |
| 10,343,277 | B2 | 7/2019 | Gombert et al. |
| 10,780,575 | B2 | 9/2020 | Reese et al. |
| 10,821,613 | B2 | 11/2020 | Yoshimura et al. |
| 11,413,761 | B2 | 8/2022 | Simkins |
| 2001/0052735 | A1 | 12/2001 | Sakamoto |
| 2008/0118204 | A1 | 5/2008 | Ankerhold |
| 2010/0314376 | A1 | 12/2010 | Zander et al. |
| 2013/0340560 | A1 * | 12/2013 | Burridge ............... B25J 17/025 74/490.05 |
| 2014/0245856 | A1 | 9/2014 | Kirihara et al. |
| 2014/0283642 | A1 | 9/2014 | Harada et al. |
| 2016/0046019 | A1 | 2/2016 | Ryu et al. |
| 2016/0195385 | A1 | 7/2016 | Hoeller et al. |
| 2017/0341228 | A1 | 11/2017 | Ryu et al. |
| 2018/0079080 | A1 | 3/2018 | Kozaki |
| 2018/0111275 | A1 * | 4/2018 | Kurek ..................... B25J 19/02 |
| 2018/0169872 | A1 | 6/2018 | Okamoto |
| 2019/0099883 | A1 | 4/2019 | Niu |
| 2019/0168395 | A1 | 6/2019 | Hay et al. |
| 2020/0269417 | A1 | 8/2020 | Riek et al. |
| 2020/0282553 | A1 | 9/2020 | Simkins |
| 2022/0118634 | A1 | 4/2022 | Pfister et al. |
| 2022/0134539 | A1 | 5/2022 | Kastler et al. |
| 2022/0143815 | A1 | 5/2022 | Kastler et al. |

FOREIGN PATENT DOCUMENTS

| | | |
|---|---|---|
| CN | 106541398 A | 3/2017 |
| CN | 107466262 A | 12/2017 |
| CN | 108858135 A | 11/2018 |
| DE | 3717597 A1 | 1/1988 |
| DE | 29912409 U1 | 9/1999 |
| DE | 102013019869 A1 | 5/2015 |
| DE | 202014010032 U1 | 3/2016 |
| DE | 202016104373 U1 | 8/2016 |
| DE | 102017104319 A1 | 9/2017 |
| DE | 102017001943 A1 | 8/2018 |
| DE | 102019120116 A1 | 1/2021 |
| DE | 102019120128 A1 | 1/2021 |
| DE | 102019120135 A1 | 1/2021 |
| EP | 0054454 A1 | 6/1982 |
| EP | 0221186 A1 | 5/1987 |
| EP | 0743143 A1 | 11/1996 |
| EP | 0901877 A2 | 3/1999 |
| EP | 1123784 A2 | 8/2001 |
| EP | 3372354 A1 | 9/2018 |
| EP | 3441205 A2 | 2/2019 |
| EP | 3476548 A1 | 5/2019 |
| WO | 9532078 A1 | 11/1995 |
| WO | 9608675 A1 | 3/1996 |
| WO | 9901261 A1 | 1/1999 |
| WO | 9960667 A2 | 11/1999 |
| WO | 2012136645 A1 | 10/2012 |
| WO | 2018158097 A1 | 9/2018 |
| WO | 2019038221 A1 | 2/2019 |
| WO | 2019081662 A1 | 5/2019 |
| WO | 2019081662 A9 | 8/2019 |
| WO | 2021013913 A1 | 1/2021 |
| WO | 2021013994 A1 | 1/2021 |
| WO | 2021013995 A1 | 1/2021 |

OTHER PUBLICATIONS

Office Action dated Nov. 11, 2023 in connection with Chinese patent application No. 202080053383.2, 21 pages including English translation.

"EtherCAT—the Ethernet Fieldbus," Beckhoff Automation GmbH, Nov. 2012, 11 pages.

Office Action dated Dec. 28, 2022 in connection with Chinese patent application No. 202080053383.2, 9 pages Including English translation.

Office Action dated Dec. 28, 2022 in connection with Chinese patent application No. 202080054360.3, 9 pages Including English translation.

International Search Report and Written Opinion issued in International Application No. PCT/EP2020/070974, mailed on Nov. 10, 2020, 22 pages including English Translation.

Office Action issued in German Patent Application No. 102019120128.4 issued on Apr. 6, 2020, 11 pages with English translation.

International Search Report and Written Opinion dated Jan. 13, 2021 in connection with International Patent Application No. PCT/EP2020/070755, 27 pages including English translation.

International Search Report and Written Opinion dated Jan. 13, 2021 in connection with International Patent Application No. PCT/EP2020/070972, 35 pages including English translation.

International Preliminary Report on Patentability dated Mar. 4, 2021 in connection with International Patent Application No. PCT/EP2020/070755, 32 pages including English translation.

International Preliminary Report on Patentability dated Jun. 24, 2021 in connection with International Patent Application No. PCT/EP2020/070974, 137 pages including English translation.

International Preliminary Report on Patentability dated Jul. 9, 2021 in connection with International Patent Application No. PCT/EP2020/070754, 24 pages including English translation.

International Preliminary Report on Patentability dated Jul. 27, 2021 in connection with International Patent Application No. PCT/EP2020/070972, 38 pages including English translation.

International Search Report and Written Opinion dated Nov. 5, 2020 in connection with International Patent Application No. PCT/EP2020/070754, 21 pages including English translation.

Office Action dated Dec. 15, 2020 in connection with German patent application No. DE 10 2019 120 116.0, 18 pages including English translation.

Office Action dated Jun. 21, 2022 in connection with Chinese Patent Application No. 202080053862.4, 11 pages Including English translation.

Office Action dated Feb. 23, 2024 in connection with Chinese patent application No. 202080053383.2, 8 pages including English translation.

"English translation of EP1123784A2" Franz, Aug. 16, 2001), cited Jul. 31, 2024 in copending U.S. Appl. No. 17/575,010.

"English translation of EP3372354A1," (Valente, Sep. 12, 2018), cited Jul. 31, 2024 in copending U.S. Appl. No. 17/575,010.

* cited by examiner

INDUSTRIAL ROBOT

CROSS-REFERENCE TO RELATED APPLICATIONS

This application is a continuation of International Patent Application PCT/EP2020/070754, filed Jul. 23, 2020, entitled INDUSTRIAL ROBOT, which claims priority of German Patent Application No. DE 10 2019 120 131.4, filed 25 Jul. 2019, entitled OPTISCHE ROTATIONS-ÜBERTRAGUNGSEINRICHTUNG FÜR EIN AUTOMATISIERUNGSSYSTEM, ARMMODUL FÜR EINEN MODULAREN ROBOTERARM SOWIE INDUSTRIEROBOTER, the disclosure of each of which is incorporated by reference herein, in the entirety and for all purposes.

FIELD

The present invention relates to an industrial robot.

BACKGROUND

The technical field of automation technology (implementation, measurement, control/regulation, communication, man/machine interface, safety, etc.) has the object of automating machines incl. industrial robots and/or systems, i.e. to be able to operate them independently and without the involvement of a human being. A degree of automation (ratio of automated production steps to all production steps) in an automation system is higher, the more independent a respective machine in a system and/or a respective system is/are from human intervention.

Goals of automation technology are a relief of humans from dangerous, strenuous and/or monotonous activities, an improvement of a quality by the technical system, a higher efficiency of the system and a cost reduction by the system. Through advances in machines, a signal detection, a signal processing and/or a communication (networking) of components within the automation system, the degree of automation of an existing or a new system may be significantly increased compared to the state of the art.

For communication, an automation system comprises corresponding components that usually communicate with one another in what is referred to as a Local Area Network, i.e. a spatially limited network in which the various network components are coupled to one another wirelessly, optically, electrically and/or optoelectrically. The network components may be one or a plurality of servers and one or more workstations (machines), so-called network elements or, topologically speaking: network nodes, which are connected to one another, e.g. via radio links, optical waveguides, coaxial cables and/or twisted pair cables (network edges) and can communicate via these.

An automation communication network used in automation technology usually corresponds to a so-called field bus system. A fieldbus system is a bus system in which decentrally arranged components of a machine periphery, such as input modules, output modules, drives, operating terminals, etc., are connected to control units via the fieldbus system. A shared transmission channel, e.g. in the form of the field bus or as a radio link, is available for data transmission. Communication between the network components within the LAN is based on network protocols.

Application-specific industrial robots (manipulators) are an integral part of automated systems. An industrial robot is a programmable machine for handling, assembling and/or machining workpieces. The industrial robot generally includes a robot base, a robot arm (manipulator) having a plurality of mutually pivotable and/or rotatable (angle of rotation limited, possibly slightly larger than about 360°) proximal (toward a robot base) and distal (away from the robot base) arm links, an (end-) effector (robot hand, tool, gripper, etc.), a local controller/regulator, and possibly a global controller/regulator. Industrial robots are frequently equipped with different sensors. When programmed, the industrial robot is able to autonomously perform a workflow or to change execution of a task depending on information from a sensor.

Arm members that may be pivoted or rotated relative to one another have a joint mechanical interface, wherein optical and/or electrical control information must be sent, electrical energy must be transported and, if necessary, fluids (gas(es) and/or liquid(s)) must be conveyed beyond the mechanical interface. One of the problems is how to transmit high-speed data via two arm members that may rotate against each other with optical waveguides. I.e., a high-speed data transmission is to be realized with optical waveguides via a rotation interface, the one side of which facing away from the industrial robot may preferably turn around, i.e. rotate, as often as desired relative to the other side facing away from the industrial robot, i.e. realizing rotation angles significantly larger (rotation angles) than 360° to 720°. An optical rotation transmitter is required for this purpose.

WO 2012/136645 A1 discloses an axial optical single-channel rotation transmitter, in which a first portion with an optical waveguide is mounted in a stationary manner and a second portion is mounted rotatably relative to the first portion with two radial ball bearings. To ensure good optical coupling between the two optical waveguides for an optical path, it is necessary to align the two end sections of the optical waveguides precisely with respect to each other. The distance between the longitudinal ends of the optical waveguides should be small, and the longitudinal ends of the optical waveguides should not touch each other to avoid mechanical abrasion. However, the structure of the rotation transmitter is complex and expensive and also requires a lot of space because of the radial ball bearings.

DE 20 2016 104 373 U1 discloses an axial rotation transmitter for optical signal transmission between a stator and a rotor. The rotation transmitter comprises a first housing and a second housing which are rotatable relative to each other about a shared axis of rotation, the first housing and the second housing each having an opening along the axis of rotation. A connection region for a ferrule and an associated optical waveguide is provided in each of the housings. Further, the housings each have a spherical lens disposed on the shared axis of rotation and facing each other across an air gap spaced apart at the respective openings. Here, the first housing and the second housing are rotatably coupled to each other by two roller bearings, the first housing embracing the second housing and the two roller bearings, and the second housing being received in both roller bearings. Here, again, the installation of the two roller bearings in the rotation transmitter requires a lot of space and prevents a cost-effective design.

Since the arm members of an industrial robot have only a small installation space, it is an object of the invention to specify a comparatively small optical low-cost rotation transmitter compared with the prior art. Furthermore, it is an object of the invention to provide an arm member for an industrial robot by which an optical signal transmission within a robot arm of an industrial robot is possible. Furthermore, it is an object of the invention to provide such a robot arm as well as such an industrial robot.

SUMMARY

The invention provides an improved industrial robot.

According to first aspect, an industrial robot comprises a modular robot arm having a plurality of arm modules, wherein at least one arm module comprises a housing with a first connection side and a second connection side, wherein the first connection side is embodied to be controllably rotatable relative to the second connection side about an axis of rotation, and wherein an optical rotation transfer device is arranged between the first connection side and the second connection side, which has an optomechanical rotation interface with a first interface side and a second interface side which face each other and are each formed essentially rotationally symmetrically and complementarily to each other, wherein the first interface side has an optomechanical rotary plug-in device with a first optical device and the second interface side has an optomechanical rotary mating plug-in device with a second optical device, which are set up so as to be rotatable relative to one another and are mounted mechanically relative to one another with a radial plain bearing and a plain bearing shell complementary thereto, wherein the optomechanical rotary plug-in device and the optomechanical rotary mating plug-in device are formed as a cylindrical hollow system, wherein a gap is formed between the first optical device and the second optical device in the axial direction of the rotation transfer device, across which gap the optical signal transmission takes place.

According to second aspect, an industrial robot comprising a modular robot arm having a plurality of arm modules, a first and a second arm module each having a housing with a first connection side and a second connection side, the first connection side being embodied to be controllably rotatable about a rotation axis relative to the second connection side, wherein a first interface side of an optical rotation transfer device is arranged in the first connection side of the first arm module and a second interface side of the optical rotation transfer device is arranged in the second connection side of the second arm module, wherein the first interface side and the second interface side face each other and are each formed substantially rotationally symmetrically and complementarily to each other, wherein the first interface side has an optomechanical rotary plug-in device with a first optical device and the second interface side has an optomechanical rotary mating plug-in device with a second optical device, which are set up to be rotatable with respect to one another and are mounted with respect to one another mechanically with a radial plain bearing and a plain bearing shell complementary thereto, wherein the optomechanical rotary plug-in device and the optomechanical rotary mating plug-in device are formed as a cylindrical hollow system, wherein a gap is formed between the first optical device and the second optical device in the axial direction of the rotation transfer device, across which gap the optical signal transmission takes place.

According to third aspect, an industrial robot comprises a modular robot arm having a plurality of arm modules, wherein at least one arm module comprises a housing with a first connection side and a second connection side, wherein the first connection side is embodied to be controllably rotatable relative to the second connection side about an axis of rotation, and wherein an optical rotation transfer device (501; 502) is arranged between the first connection side and the second connection side or a second connection side of a further arm module, which has an optomechanical rotation interface with a first interface side and a second interface side which face each other and are each formed essentially rotationally symmetrically and complementarily to each other, wherein the first interface side has an optomechanical rotary plug-in device with a first optical device and the second interface side has an optomechanical rotary mating plug-in device with a second optical device, which are set up so as to be rotatable relative to one another and are mounted mechanically relative to one another with a radial plain bearing and a plain bearing shell complementary thereto, wherein the optomechanical rotary plug-in device and the optomechanical rotary mating plug-in device are formed as a cylindrical hollow system, wherein a gap is formed between the first optical device and the second optical device in the axial direction of the rotation transfer device, across which gap the optical signal transmission takes place, wherein the rotary plug-in device comprises a first ferrule and the rotary mating plug-in device comprises a second ferrule, wherein the first ferrule and the second ferrule are each arranged rotatably relative to one another within a radial bearing sleeve at least in sections, wherein the radial bearing sleeve has an inner circumferential collar on which the first ferrule and/or the second ferrule may be axially seated

EXAMPLES

The rotation transfer device for an optical signal transmission has an optomechanical rotation interface with a first interface side and a second interface side, which face each other and are each substantially rotationally symmetrical and complementary to each other. The first interface side and the second interface side are embodied to rotate relative to each other. The first interface side and the second interface side are mechanically supported with respect to each other with a radial plain bearing on one interface side and a plain bearing shell complementary thereto on the other interface side. A gap is formed between the first interface side and the second interface side in the axial direction of the rotation transmitter, via which the optical signal transmission takes place.

The radial plain bearing prevents two of three translational degrees of freedom (axes up and transverse to the axis of rotation, i.e. all radial directions) as well as two of three rotational degrees of freedom (axes up and transverse to the axis of rotation of the rotational interface) due to its particularly significant axial extension. The radial plain bearing may also be referred to as a rotational plain bearing.

Rotation is understood to mean rotations by which any number of full revolutions (360°), preferably in each of the two circumferential directions is possible about an axis of rotation. A rotation is also understood to mean a rotation of slightly less or slightly more than approx. 360° about the axis of rotation.

The rotation transfer device is embodied as an axial (on-axis) optical single-channel rotation transfer device. At least one of the interface sides is embodied as a rotatable interface side. In this context, both interface sides may also be embodied as a rotatable interface side.

Signal transmission across the mutually rotatable interface sides, or signal transmission preferably centrally within the radial bearing consisting of the radial plain bearing on the one interface side and the complementary plain bearing shell of the other interface side takes place through a gap extending narrowly in the axial direction of the rotation transfer device, the gap preferably being embodied as a fluid gap, in particular an air gap. The interface sides are thus set up spaced apart from one another across the gap in the rotation transfer device. The gap may have a rotationally symmetrical embodiment. In this way, a mechanically contactless or contact-free optical signal transmission is implemented.

The interface sides which may be rotated relative to each other may have a substantially fixed position in the axial direction, wherein the interface sides are preferably mechanically pre-tensioned against each other in the axial direction. This ensures that the gap width does not change, e.g. even in the event of vibrations.

In the optical rotation transfer device, one interface side may have an optomechanical rotary plug-in device which is embodied to correspond to an optomechanical rotary mating plug-in device of the other interface side, the rotary plug-in device and the rotary mating plug-in device being embodied to be complementary. In a simple manner, one interface side may thus function as a stator and the respective interface mating side as a rotor. The stator or the rotor may have the radial plain bearing associated therewith. Furthermore, at least one rotary plug-in device may be a component of a higher-level technical entity. Here, this entity may e.g. be embodied as a connector.

The optical rotation transfer device may be in the form of a cylindrical hollow system in which two optical devices are arranged externally in a substantially cylindrical shape, rotatable within a hollow cylinder. The optical devices may be in the form of a sleeve, hereinafter also referred to as a ferrule. In this case, the rotation transfer device may have a first optical ferrule and a second optical ferrule, the two ferrules each being set up so as to be rotatable relative to one another at least in sections within a radial bearing sleeve.

This means that in addition to the two rotatable optical devices in the hollow cylinder, in particular the two ferrules in the radial bearing sleeve for signal transmission, no additional optical device such as a lens, prism, etc. is used. In this case, an optical waveguide may be mechanically and optically connected to the first or second ferrule. For example, the optical waveguide is inserted into the ferrule and glued. A rotating entity may be exactly one or at least one ferrule of an optical waveguide, which rotates in the process. The ferrules may also be referred to as optical waveguide sleeves. Preferably, the radial bearing sleeve is formed as a ceramic sleeve, in particular based on zirconium. Furthermore, the ferrule in question is preferably embodied as a ceramic ferrule, also in particular based on zirconium.

Furthermore, in the present radial plain bearing, the at least two circumferential sections moving relative to each other are in direct contact in the circumferential direction (radial form fit). They slide on each other against a frictional resistance caused by sliding friction. Said friction may be comparatively small if a low-friction material pairing is selected.

The radial bearing sleeve of the rotation transfer device may have an inner circumferential collar on which at least one or both ferrules may be axially seated (axially mountable in one translational direction in each case). In this case, the radial bearing sleeve with the inner circumferential collar is embodied as a radial bearing for the respective ferrule, with the respective ferrule still having a translational degree of freedom which may be prevented with a receptacle for the respective ferrule.

Furthermore, the radial bearing sleeve may have a longitudinal through continuing along the entire axial direction of the rotation interface, which gives the radial bearing sleeve a certain resilience in the circumferential direction despite longitudinal rigidity. Furthermore, the longitudinal through slot may serve to compensate for tolerances.

The respective interface side or the respective rotational plug-in device may comprise a receptacle for the respective ferrule, wherein the ferrules and receptacles relating to each other are fixedly connected to one another. Preferably, a respective ferrule is fixedly received in its respective receptacle in all translational and rotational directions; this preferably concerns both ferrules in their receptacles.

At least or exactly one of the two receptacles may comprise the radial plain bearing. In this case, the radial plain bearing may be provided in one material piece at/in the receptacle or be embodied integrally at/in the receptacle. The radial plain bearing may also be formed as a third part in addition to the ferrule in question. Furthermore, the radial plain bearing or the radial bearing sleeve may be arranged between the respective ferrule and the respective receptacle on/in the receptacle. Preferably, the radial plain bearing or the radial bearing sleeve is provided on the stator side. Furthermore, at least one receptacle may be set up in the rotation transfer device in a pre-tensioned manner with respect to the other receptacle concerned by a mechanical spring. Instead of a spring, an elastic element is applicable, as well.

In an alternative embodiment, the rotary plug-in device may comprise a first lens having a first lens receptacle and the rotary mating plug-in device may comprise a second lens having a second lens receptacle. The first lens receptacle and the second lens receptacle then form the radial plain bearing and the complementary plain bearing shell. Optical signal transmission using lenses has reduced alignment accuracy requirements, so that a radial bearing embodied by the lens receptacles is sufficient.

Features of an arm module for a robot arm or an industrial robot described below are also applicable to the rotation transfer device described above. Furthermore, features of the rotation transfer device described above are also applicable to an arm module for a robot arm or an industrial robot described below.

In the arm module, a housing mechanically connects a first connection side to a second connection side. The second connection side may be provided on the torso side (J, L or T arm module) or likewise on the front face side (I arm module) of the housing, in the latter case, however, opposite to the first connection side. Furthermore, the two connection sides or connection sides relating to one another may be embodied in a complementary (male and female) or analogous manner.

The arm module may be embodied in such a way that an optical signal, an electrical signal and/or a fluid may be exchanged with the further arm module via the first connection side and/or via the second connection side. Here, the first connection side is mechanically, opto-electrically and/or fluidically connected to the second connection side.

In the arm module, the first connection side is embodied to be controllably rotatable about an axis of rotation relative to the second connection side. Between the first connection side and the second connection side, an optical rotation transfer device, which is embodied in the manner described above, may be provided for optical signal transmission between the first connection side and the second connection side. However, alternatively, the first interface side of an optical rotation transfer device formed in the manner described above may be arranged in the first connection side and the second interface side of an optical rotation transfer device formed in the manner described above may be arranged in the second connection side.

The first connection side may be set up in/on the arm module so that it may rotate about a rotation axis. The second connection side may be set up at/in the arm module in a torque-proof manner. In this case, the arm module is preferably embodied in such a way that the first connection side may be rotated in a controlled manner (predetermined angle) about the axis of rotation relative to the second connection side. However, the first and second connection sides may also swap places.

A drive device may rotate in the housing of the arm module via a connection device on the first connection side. The drive device may e.g. be embodied to be electrically or fluidically drivable. In particular, the drive device is arranged in the housing in the axial direction adjacent to the first connection side.

The drive device may be embodied as an electric motor with a preferably outer stator and a preferably inner rotor mounted rotatably about the axis of rotation, the rotor being torque-locked to the first connection side or its connection device. The stator is preferably circumferentially surrounded by the housing and is connected to it in a torque-proof manner.

Furthermore, the drive device may have a gear device. The gear device is preferably set up axially between the rotor and the first connection side or its connection device. The gear device comprises at least an input side and at least an output side, the input side being connected to the rotor in a torque-proof manner and the output side being connected to the first connection side in a torque-proof manner.

The gear device is embodied to preferably reduce an input speed of the electric motor on its input side to an output speed on its output side. The gear device preferably has a second input side which is fixedly connected to the housing. In particular, the gear device may comprise a planetary gear, an eccentric gear, a cycloidal gear or a strain wave gear.

Furthermore, the drive device preferably comprises a (drive) hollow shaft and an output shaft. The hollow shaft and the output shaft are each rotatably mounted about the axis of rotation, with the output shaft being rotatably received in the hollow shaft. Here, the hollow shaft is connected to the first input side of the transmission device in a torque-proof manner. Furthermore, the output side of the gear device is connected to the output shaft in a torque-proof manner. In particular, the electric motor may be a servo motor, a DC motor, a stepper motor or a torque motor.

The connection device may be connected to the output shaft of the drive device in a torque-proof manner, extending into the housing and the hollow shaft. The connection device may be embodied as a rotatable connection device (male). In this case, apart from its axial length (thickness), the connection device essentially extends in a radial plane of the arm module and is embodied for mechanical attachment of a further arm module. The connection device of the first connection side is embodied as a mechanical, optical electrical and/or fluid connection device.

A connection device of the second connection side may be embodied as a connection socket (female) or connection device (male). The connection device or, respectively, the connection socket of the second connection side is embodied as a mechanical, opto-electrical and/or fluid connection device or connection socket. The connection device of the first connection side is mechanically, optically, electrically and/or fluidically coupled to the connection device or the connection socket of the second connection side of the arm module.

The output shaft may comprise the rotary plug-in device at the first connection side, wherein the rotary plug-in device may be rotated with the shaft. The rotary plug-in unit may be fixed in the housing relative to the output shaft.

The rotary plug-in device may have a first receptacle, e.g. in the form of a tube, in particular a brass tube, to/in which the first optical ferrule is fixed. The first receptacle further accommodates the optical waveguide. Here, the output shaft may rotate around the first receptacle and thus around the optical waveguide, whereas the connection device of the first connection side may rotate around the rotary plug-in device.

The first receptacle may be rotationally mounted in the connection device of the first connection side by a rotation bearing, in particular by a plain bearing. The first receptacle may extend into the output shaft or through the output shaft and be fixed to the housing in the output shaft. In this case, the first receptacle may be fastened indirectly or directly to the inside of the housing. The output shaft may rotate around the receptacle, for which the output shaft has a corresponding axial through recess. It is also possible to embody the first receptacle, and thus the optical waveguide, so that it may rotate with the shaft.

The rotary plug-in mating device may have a second receptacle, to/in which the second optical ferrule is fixed. In this case, the second receptacle may be mounted in the housing on a plain bearing.

The housing also preferably contains a rotary feedthrough by which a fluid, in particular air, may be rotationally transmitted within the module. Furthermore, a slip ring arrangement may be installed within the housing, by which electrical voltage and/or energy may be rotationally transmitted within the module. In addition, a combined transmitter/receiver unit, also referred to as a transceiver, may be set up in the housing, by which optical and electrical signals may each be converted into one another. The transmitting unit and the receiving unit may also be embodied separately instead of as a transceiver. Furthermore, a module control unit may be set up in the housing, by which the drive unit may be controlled/regulated.

The advantages of optical signal transmission are not only a very high possible data rate—currently up to 100 Gbit/s via one channel—but also a very low space requirement of the rotation transfer device. A single-mode optical waveguide without a cladding is only about 0.125 mm thick, with cladding a space requirement increases to about 0.9 mm. With an inner possible diameter of the output shaft of approx. 3 mm, there is thus sufficient space for the optical waveguide.

For higher data rates, it is merely required to exchange a respective transmitting unit and a receiving unit communicating with it; the optical waveguide may remain the same and thus remain in place. This ensures easy scalability for future tasks, which would not be possible with electrical slip contacts. To set up bidirectional operation, two different wavelengths may be transmitted over the same optical waveguide.

An industrial robot having a modular robot arm comprises a plurality of arm modules formed in the above manner. The industrial robot may comprise a robot base, a/the robot arm and/or a plurality of proximal and distal arm modules rotatable relative to one another, an effector, and optionally a global controller. In the case of the industrial robot, an initial module, an end module, and/or an effector may be formed in addition to arm modules. The rotation transfer device may be set up in the arm module itself or between two arm modules.

The features of the description may also be interpreted as optional features; i.e. each feature may be understood as an optional, arbitrary or preferred, i.e. a non-binding, feature. Thus, it is possible to extract a feature, possibly including its periphery, from an embodiment example, in which case this feature may be applied to a generalized idea of the invention. The absence of a feature in an embodiment example shows that the feature is optional with respect to the invention.

DETAILED DESCRIPTION

Figure 1:
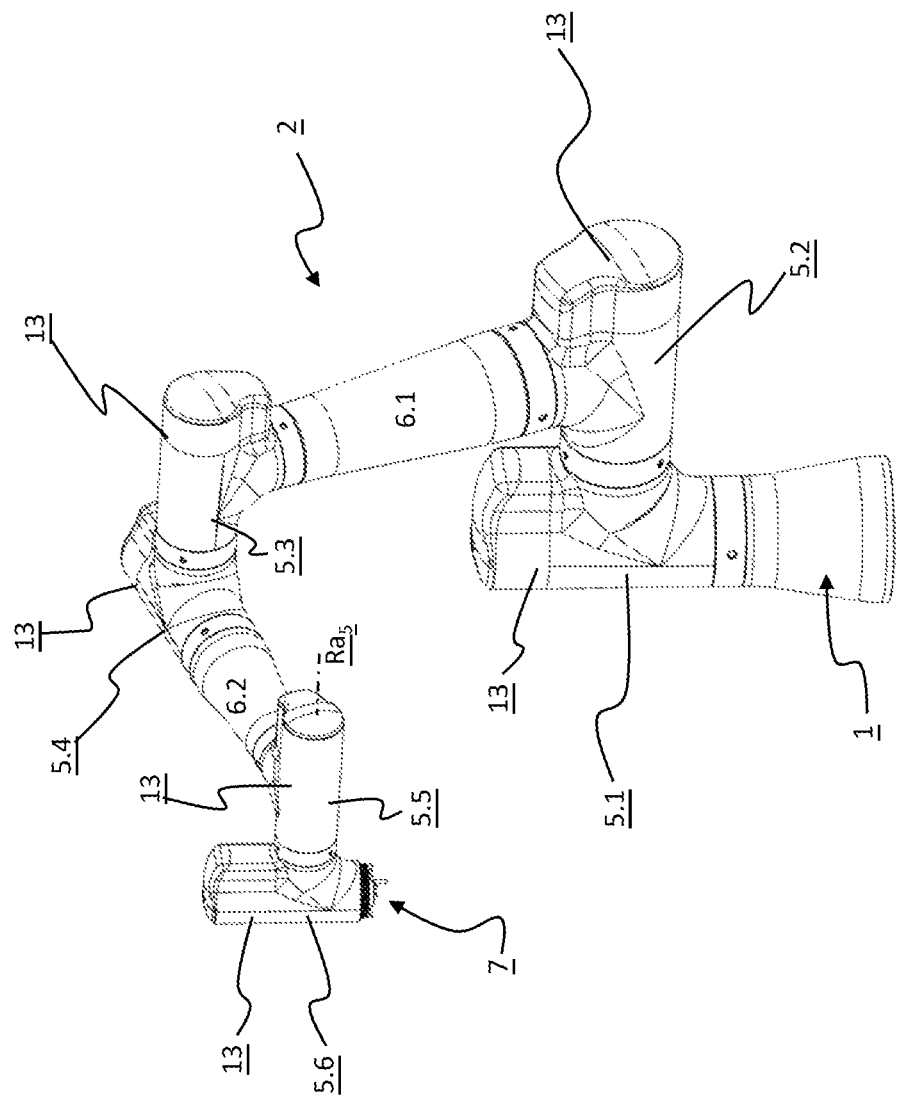
FIG. 1 shows a three-dimensional side view of an industrial robot with a modular, six-axis robot arm.

The present invention is described in more detail below with reference to embodiments of variants of an optical rotation transfer device for embodiments of a modular robotic arm for an industrial robot. Although the invention is described and illustrated in more detail by the embodiments, the invention is not limited by the disclosed embodiments, but is of a more fundamental nature.

In the drawing, only those spatial sections of an object of the invention are shown which are necessary for understanding the invention. Further, the explanation of the invention hereinafter refers to a polar coordinate system having an axial direction Ar, a radial direction Rr and a circumferential direction Ur. An axis of rotation Ra of a particular arm module is thereby coaxial or parallel to an axial direction Ar relating to that arm module.

Two principal designs of optical rotation transmitters are the so-called axial (on-axis) designs and the so-called non-axial (off-axis) designs. Axial optical rotation transmitters are simpler in their design than non-axial designs, however, they must be located on a rotational axis Ra. There are different designs, both with and without optical components such as lenses or prisms. Beam delivery with prisms is mainly used for multi-channel solutions. If only one optical path is to be transmitted, prisms may be dispensed with.

In an embodiment of a typical axial optical single-channel rotation transmitter, in order to ensure good optical coupling between the two optical waveguides for an optical path, it is necessary to align the two end sections of the optical waveguides precisely with each other. The distance between the longitudinal ends of the optical waveguides should be small, and the longitudinal ends of the optical waveguides should not touch each other to avoid mechanical abrasion.

A high-speed signal transmission between two arm modules of a robot arm of an industrial robot, which are rotatable relative to each other, is to be realized. The arm modules are to be connectable to each other via pluggable and/or screwable contacts. A device for signal transmission must therefore also be pluggable and include a rotation transmitter.

An achievable data rate of the signal transmission should be at least sufficient for an EtherCAT and/or a Gigabit Ethernet connection, i.e. the achievable data rate should be at least 1.1 Gbit/s. However, depending on the embodiment, lower data rates of the signal transmission may also be used. The rotation transmitter should be robust and able to maintain its functionality in an industrial environment. The real-time capability of EtherCAT should not be impaired. At the same time, the rotation transmitter should be cost-effective and space-saving, since the individual arm modules should be compact and offered at a competitive price.

For signal transmission, optical signals routed through an optical waveguide have proven to be at least a very good option. So-called SFP modules (SFP: small form-factor pluggable) are to be used as transceivers, which act as signal converters between electrical and optical signals and vice versa. An optical rotation transmitter may be installed between the arm modules in order to be able to realize the specification of an arbitrary rotatability of the arm modules relative to each other. So-called multimode and single-mode optical waveguides are available for guiding and transmitting optical signals. Single-mode optical waveguides have proven their worth for high data rates because they have significantly lower attenuation, i.e. vanishingly small mode dispersion, and are therefore the preferred choice for this application.

Furthermore, it must be taken into account for optical rotation transmitters that an optical signal is attenuated due to the air gap. For commercial rotation transmitters, an average loss of approx. 2 dB to approx. 3 dB is specified. Due to tolerances, this attenuation is not constant over a complete revolution, but may vary by up to 1 dB.

Despite these disadvantages, optical signal transmission is a very suitable method for the aforementioned task mentioned at the beginning. However, conventional optical rotation transmitters are both too large and too cost-intensive to be considered for use in a robot arm or an industrial robot or, respectively, for individual arm modules thereof. The present invention solves this problem for an industrial robot or a robot arm or for individual arm modules thereof.

FIG. 1 shows an exemplary embodiment of a variant of a robot arm 2 of an industrial robot, which may also be referred to as a handling robot or working machine. An industrial robot is an automatic machine with several degrees of freedom for automation technology, which may perform various functions in a working environment in (conditional) autonomous performance with a pre-programmed controller/regulator. The industrial robot comprises a robot base 1, the robot arm 2 and a preferably exchangeable (end) effector, also referred to as a robot hand, with e.g.: a tool, a gripper etc. which is arrangeable or arranged at a distal end 7 of the robot arm 2.

The robot arm 2 has two to six axes of motion. In the embodiment shown in FIG. 1, six rotational degrees of freedom are provided. Any number of complete and partial rotations of a respective arm module of the robot arm 2 in both circumferential directions of a respective rotational axis may be performed. It is possible to embody a respective rotational axis also as a pivot axis or rotational axis, i.e. to limit a movement of the respective arm module to a certain angle, such as angles smaller than: 720°, 540°, 360°, 270°, 180°, 90° or 45°.

Sensors may be assigned to an arm module or a respective rotation axis Ran of the arm module, the data of which may be used for a control/regulation of the corresponding arm module or the robot arm 2. For example, a force and/or torque sensor as well as a position sensor may be provided, by which a force and/or torque on the arm module as well as a position of the arm module may be detected. This may also be limited to a portion or a longitudinal end portion of the robot arm 2.

The present robot arm 2 of the industrial robot has a modular design, in particular with a plurality of arm modules. In principle, the arm modules may be embodied as desired, wherein, as shown in FIG. 1, a distinction may be made between active arm modules 5 and passive arm modules 6. An active arm module 5 has a drive device 13 by which a further arm module connectable thereto may be swiveled, pivoted and/or rotated. Similarly, a passive arm module 6 has no drive device.

A specific modular system for a robot arm 2 comprises at least one type of active arm module 5 in J-shape and, if applicable, at least one type of passive arm module 6 in I-shape, in each case with connections on the front face and/or longitudinal/trunk side and in each case mechanically complementary or mechanically analogous to one another. Instead of a J-shape for the active arm module 5 or an I-shape for the passive arm module 6, other geometric shapes may be used.

Apart from the robot base 1 and/or an effector at the distal end 7, all arm modules of such a modular system for robot arms 2 are preferably embodied in such a way that two connections of two arm modules always correspond to one another and may be connected to one another. This means that a first connection side of any arm module of the modular system may be connected to a second connection side of any other arm module of this modular system, or vice versa. Preferably, the first connection side and the second connection side of the arm module each have a uniform, complementary contacting mimic, which ensures compatibility of the arm modules across relevant, in particular all, series of the modular system.

In FIG. 1, the active arm modules 5 and the passive arm modules 6 are each provided with an additional number for differentiation, separated by a dot, and numbered starting from the robot base 1 in the direction of the distal end 7. In the robot arm 2 in the embodiment according to FIG. 1, a first active arm module 5.1 is connected to the robot base 1 at the first connection side. The first connection side of a second active arm module 5.2 is connected to the second connection side of the first active arm module 5.1. A first passive arm module 6.1 is arranged between the second active arm module 5.2 and a third active arm module 5.3, which connects the second connection side of the second active arm module 5.2 to the second connection side of the third active arm module 5.3. The second connection side of a fourth active arm module 5.4 is connected to the first connection side of the third active arm module 5.3. The first connection side of the fourth active arm module 5.4 is connected to the second connection side of a fifth active arm module 5.5 via a second passive arm module 6.2. The second connection side of a sixth active arm module 5.6 is connected to the first connection side of the fifth active arm module 5.5, the first connection side of which then forms the distal end 7 of the robot arm 2.

Figure 2:
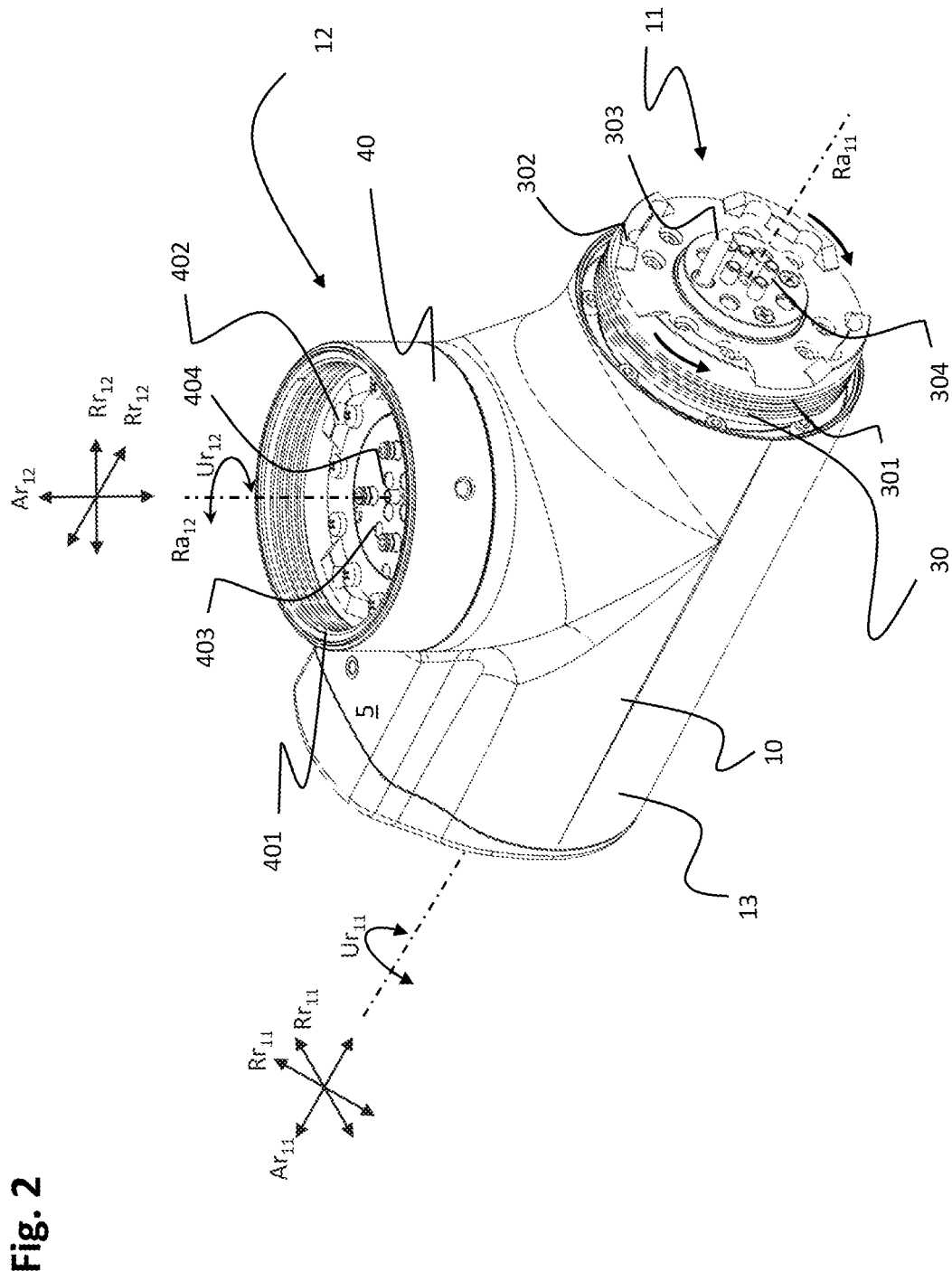
FIG. 2 shows a perspective view from diagonally above of an active arm module for a robot arm of FIG. 1.

FIG. 2 shows an example of an active arm module 5 for the robot arm 2 from FIG. 1 in a perspective view from diagonally above. Here, a housing 10 in J-shape mechanically connects the first connection side 11 with the second connection side 12. For the first connection side 11 and the second connection side 12, a respective polar coordinate system with an axial direction Ar, a radial direction Rr and a circumferential direction Ur is shown, each of which is provided with a corresponding index for the associated connection side. Furthermore, an associated rotational axis Ra with the corresponding index is shown for each connection side.

The first connection side 11 of the active arm module 5 may be mechanically, optically, electrically and/or fluidically coupled to the second connection side of a further arm module. Furthermore, the second connection side 12 of the active arm module 5 may be mechanically, optically, electrically and/or fluidically coupled to the first connection side of a further arm module. Here, the first connection side 11 of the active arm module 5 is preferably rotatably provided on the active arm module 5, with the second connection side 12 then being fixedly installed on the active arm module 5. However, the determination of rotatable and non-rotatable connection side may also be exactly the opposite. In a passive arm module 6 in FIG. 1, both the first connection side and the second connection side are rigidly embodied on an I-shaped housing. The first connection side and the second connection side of the active and passive arm modules are embodied to correspond to each other.

In the arm module 5 shown in FIG. 2, the first connection side 11 has a first rotatable connection device 30 and the second connection side 12 has a second connection device 40 fixed to the housing.

The rotatable first connection device 30, which extends perpendicularly to the axis of rotation $Ra_{11}$ of the first connection side 11, is circular a top view and is rotatably arranged at the housing 10. An external thread 301 is provided on an outer peripheral side of the first connection device 30. The first connection device 30 has a first spur toothing 302 having four teeth, which is formed as a Hirth toothing. Furthermore, a centering pin 303 is provided on the first connection device 30. The first connection device 30 further comprises a first contact device 304 that includes optical, electrical, and/or fluidic interfaces.

The second connection device 40, which is fixed to the housing and is also circular in a top view, is aligned perpendicular to the axis of rotation $Ra_{12}$ of the first connection side 12 and is connected to the housing 10 in a torque-proof manner. On the circumferential side, the second connection device 40 has a fastening ring 401 with an internal thread, the internal thread being embodied to correspond to the external thread 301 of the first connection device 30.

The second connection device 40 further comprises a second spur toothing 402 having four teeth, which is formed as a Hirth toothing and is complementary to the first spur toothing 302 of the first connection device 30. The second connection device 40 further provides a centering receptacle 403 corresponding to the centering pin 303 of the first connection device 30. The second connection device 40 further includes a second contact device 404 that includes optical, electrical and/or fluidic interfaces that are complementary to the optical, electrical and/or fluidic interfaces of the first contact device 304 of the first connection device 30.

When assembling the robot arm 2 as shown in FIG. 1, the first connection device 30 of an active arm module 5 is placed on the second connection device 40 of a first further active arm module 5. In the process, the centering pin 303 engages in the centering receptacle 403. By twisting the fastening ring 401, the internal thread is screwed onto the external thread 301, pressing the second connection device 40 onto the first connection device 30. In the pressed-on state, the first spur toothing 302 and the second spur toothing 402 then engage with each other in such a way that the first connection device 30 and the second connection device 40 are torque-locked to each other. Furthermore, the first contact device 303 contacts the second contact device 403 so that a transmission between the two contact devices is ensured via their interfaces.

The assembly was explained as an example for two active arm modules 5 of the robot arm 2 in FIG. 1. Passive arm modules 6 are mounted in the same way. By connecting the first connection device 30 to the second connection device 40, adjacent arm modules are mechanically attached. Furthermore, an optical, electrical and/or fluid connection may also be provided for transmitting optical signals, electrical signals and/or the fluid.

Figure 3:
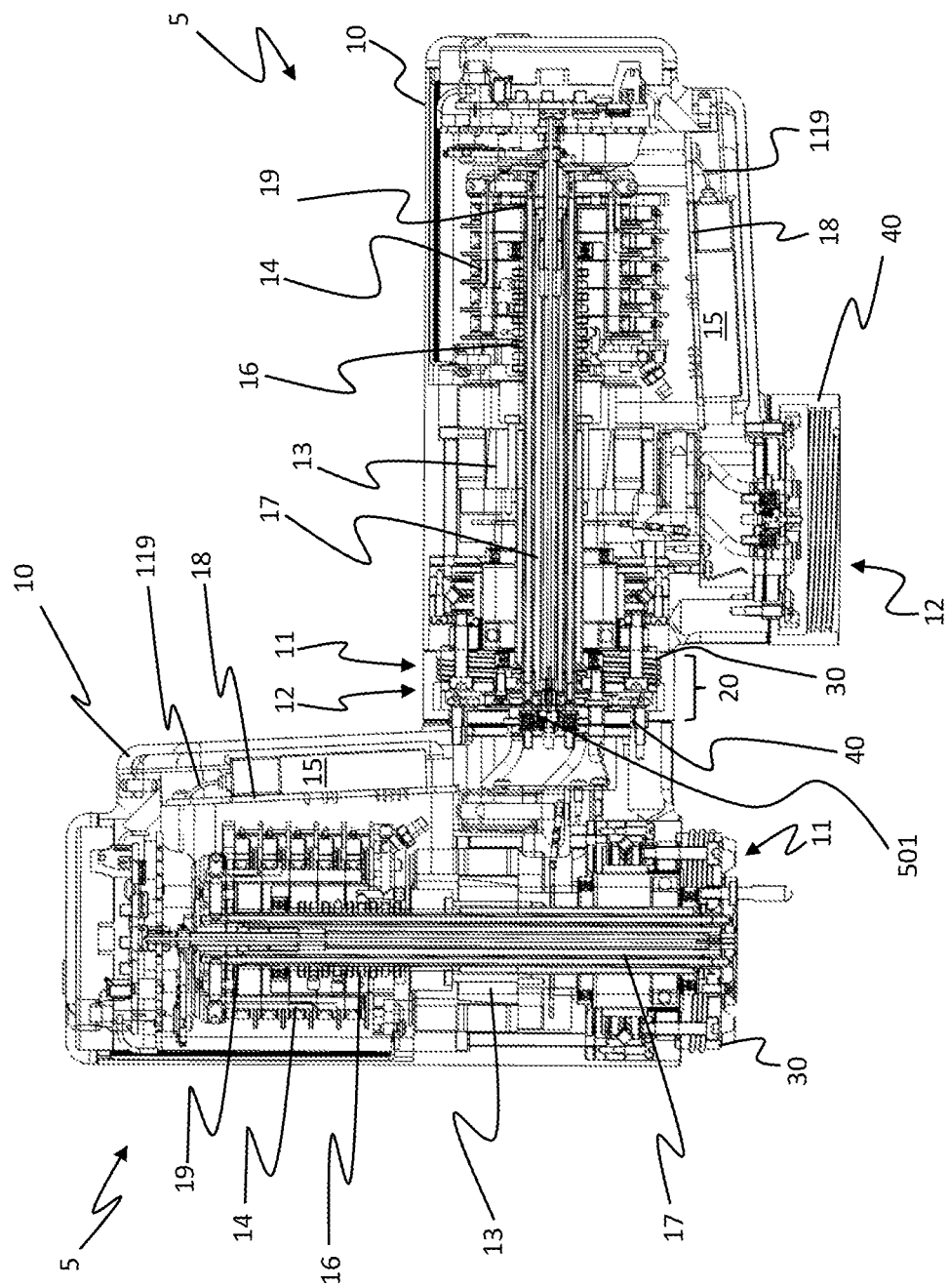
FIG. 3 shows a central section of a two-dimensional side view of two interconnected active arm modules of the industrial robot according to FIG. 1, with a first embodiment of an optical rotation transfer device.

In a centrally sectional, two-dimensional side view, FIG. 3 shows two interconnected active arm modules 5 of the industrial robot according to FIG. 1 in a first embodiment. Here, the two active arm modules 5 are provided with the first connection side 11 and the second connection side 12 shown in FIG. 2. The two arm modules 5 have an identical structure, which is why the same reference numerals are used for the components of the two arm modules. For reasons of clarity, hatching of the sectional areas has been omitted.

The facing first and second connection sides 11, 12 of the two arm modules 5 constitute a mechanical interface 20, wherein the rotatable first connection device 30 of the first connection side 11 and the housing-fixed second connection device 40 of the second connection side 12 lie on top of each other and have been assembled in the manner explained above.

The drive device 13 is set up in the housing 10 of the active arm module 5, the drive device 13 preferably having an electric motor and, as the case may be, a gear device. Between the electric motor and the gear device, a shaft assembly 19 of the drive device 13 is preferably arranged, with a hollow shaft which may in particular rotate comparatively quickly and in which an output shaft 17 is arranged which may in particular rotate comparatively slowly.

The electric motor drives the fast hollow shaft as input shaft of the gear unit at an output speed. An output of the gear device is preferably connected to the slow output shaft 17 in a torque-proof manner. The output shaft 17, in turn, is connected to the first connection device 30 of the first connection side 11 in a torque-proof manner and, starting from the latter, extends into the hollow shaft and preferably also through the latter, preferably being mounted by a rotational bearing.

With the output shaft 17, the first connection side 11 and the second connection side 12 are optically, electrically and/or fluidically connected to each other within the active arm module 5. The output shaft 17 also functions as a participant or portion of an optical, electrical and/or fluidic rotation transfer within the active arm module 5.

As shown in FIG. 3, the active arm module 5 comprises, between the housing 10 and the output shaft 17, a slip ring device 14 fixedly connected to the housing 10 for a rotation transfer of electric voltage and/or energy to the first connection side 11. Further, as shown in FIG. 3, the active arm module 5 comprises a rotational feedthrough 16 for a rotation transfer of a fluid, which ensures a fluid-tight transition between a fixed portion and a rotatable portion of the active arm module 5. In this case, the rotational feedthrough 16 may be at least partially arranged in the slip ring device 14 or further support the slip ring device 14 by a rotational bearing or vice versa. Such a radial arrangement is space-saving and allows for a small overall size.

Furthermore, the active arm module 5 has an electronic module control unit 18 for, among other things, controlling the drive device 13. The module control unit 18 receives its control data from a transceiver 15 which is preferably provided on a circuit board of the module control unit 18, may also be referred to as a transceiver unit and is preferably embodied as a bidirectional SFP module. An integrated circuit of the transceiver 15, on the one hand, electrically processes and transmits signals received from its photodiode and, on the other hand, converts received electronic signals into suitable optical pulses for its laser. Such SFP modules are standard in network technology.

The transceivers 15 of the module control units 18 of the two adjacent active arm modules 5 communicate optically with each other via optical waveguides 119, short portions of which are shown in FIG. 3. The optical waveguides 119 thereby also connect the first and second connection sides 11, 12 within the housing 10 to the respective transceiver 15 of the active arm module 5. The optical transmission path in the housing 10 of the active arm module 5 runs from the first connection side 11 via the optical waveguide 119, which is first arranged in the output shaft 17 and then led out of the output shaft 17, to the transceiver 15 and from the transceiver 15 on to the second connection side 12 via the optical waveguide 119. The optical data transmission may thereby be bidirectional.

Due to the mutual rotatability of the two active arm modules 5, a first optical rotation transfer device 501 is set up between the optical waveguides 119 leading to the two transceivers 15, said first optical rotation transfer device 501 being located in the area of the mechanical interface 20, as shown in FIG. 3. Thus, communication takes place between two transceivers, i.e. from one transceiver 15 via the optical waveguide 119, via the first optical rotation transfer device 501 with the gap 312, and again via an optical waveguide 119 into the other transceiver 15 and vice versa.

Figure 4:
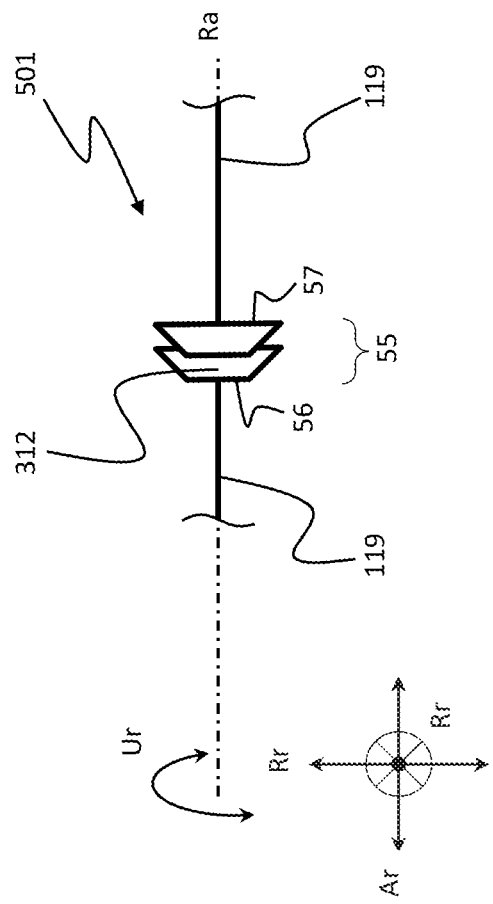
FIG. 4 shows an equivalent circuit diagram of a generic form of an optomechanical rotation interface.

In the following, with reference to FIG. 4, a generic form of the first optical rotation transfer device 501 of FIG. 3 is explained in more detail. In FIG. 4, a polar coordinate system with an axial direction Ar, a radial direction Rr, a circumferential direction Ur, and an associated rotational axis Ra is depicted to show the orientation of the individual components.

The first optical rotation transfer device 501 comprises a optomechanical rotation interface 55 having a first optomechanical interface side 56 and a second optomechanical interface side 57 facing each other. The first interface side 56 is connected to the optical waveguide 119 of the active arm module 5 in FIG. 3, and the second interface side 57 is connected to the optical waveguide 119 of the other active arm module 5 in FIG. 3. The first interface side 56 and the second interface side 57 are each preferably embodied to be substantially rotationally symmetrical and preferably complementary to each other, i.e., interface complementary and/or rotationally complementary.

As a result, the first interface side 56 and the second interface side 57 are set up so as to be rotatable relative to one another about the axis of rotation Ra in the rotational interface 55, the first and second interface sides 56, 57 being mechanically mounted with a radial plain bearing relative to one another or to one another. This takes place with a radial plain bearing on one interface side and a plain bearing shell, complementary thereto, on the interface opposite side, a gap 312 being formed between the first interface side 56 and the second interface side 57 in the axial direction Ar. The optical signal transmission takes place across the gap 312.

The first and second interface sides 56, 57, which are rotatable relative to each other, have an essentially fixed position in the axial direction Ar, and the first interface side 56 and the second interface side 57 may be mechanically biased relative to each other in the axial direction Ar.

Here, the gap 312 is arranged in to the first optical rotation transfer device 501 of FIG. 3 in the mechanical interface 20 between the rotatable connection device 30 of one active arm module 5 and the housing-fixed connection device 40 of the other active arm module 5. In principle, however, it is possible to form the rotational interface 55 without such a mechanical interface 20 or to provide the mechanical interface 20 away from such an interface, i.e., as an offset arrangement of the rotational interface 55 with respect to the actual mechanical interface 20. The gap 312 is then also not located in the area of the mechanical interface 20.

The first interface side 56 may be constituted by an optomechanical rotary plug-in device. The second interface side 57 may be constituted by a rotary mating plug-in device. In this case, the rotational plug-in device forms the radial plain bearing and the rotational mating plug-in device and the plain bearing shell complementary to the radial plain bearing.

Figure 5:
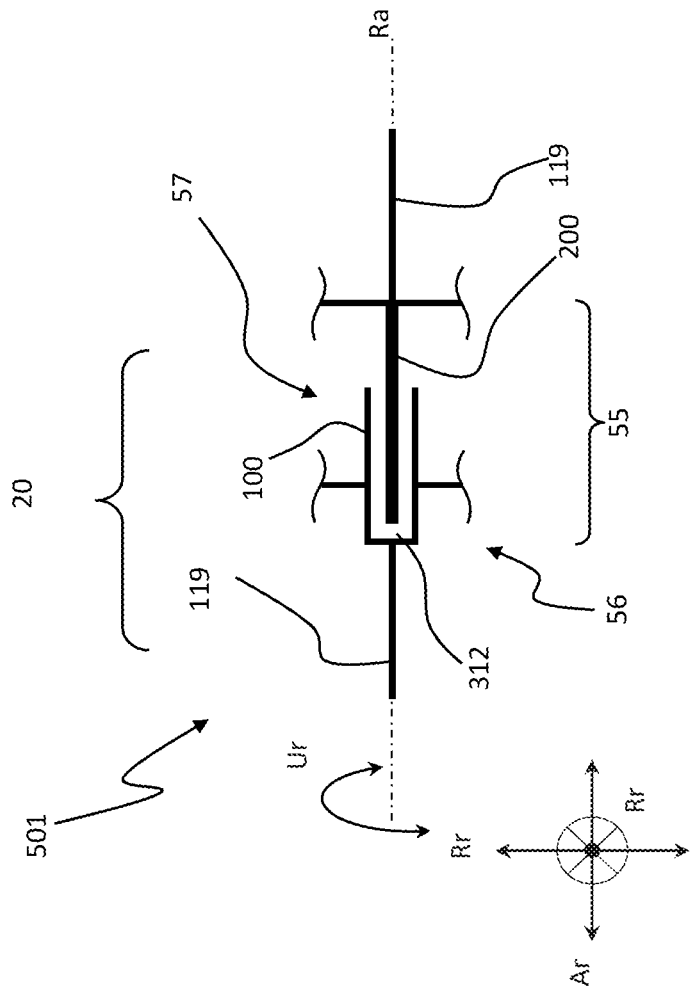
FIG. 5 shows an equivalent circuit diagram of an embodiment of the optomechanical rotation interface of FIG. 4.

FIG. 5 shows a possible embodiment of the rotation transfer device, which is described in generic form in FIG. 4. FIG. 5 again shows the polar coordinate system of FIG. 4 with the axial direction Ar, the radial direction Rr, the circumferential direction Ur and the associated rotational axis Ra to indicate the orientation of the individual components.

The first optical rotation transfer device 501 according to FIG. 5 has a bushing-like rotary plug-in device 100 in which a pin-like rotary mating plug-in device 200 may be partially accommodated or vice versa. Here, in the set-up, e.g. detachably plugged, first optical rotation transfer device 501, the rotary mating plug-in device 200 is provided as a plain bearing shell in the rotary plug-in device 100 as a radial plain bearing, i.e. is mounted on a plain bearing.

Optical signal transmission between the first interface side 56 and the second interface side 57 occurs across the gap 312 formed between the rotary plug-in device 100 and the rotary mating plug-in device 200 in the axial direction Ar. The rotary plug-in device 100 and the rotary mating plug-in device 200 are formed in an interface-complementary and rotation-complementary manner with respect to each other so that they may swivel, pivot and rotate with respect to each other. Here, the rotary plug-in device 100 or the rotary mating plug-in device 200 may be stationary or fixed to the housing. It is also possible to embody the rotary plug-in device 100 and the rotary mating plug-in device 200 as rotors.

Figure 6:
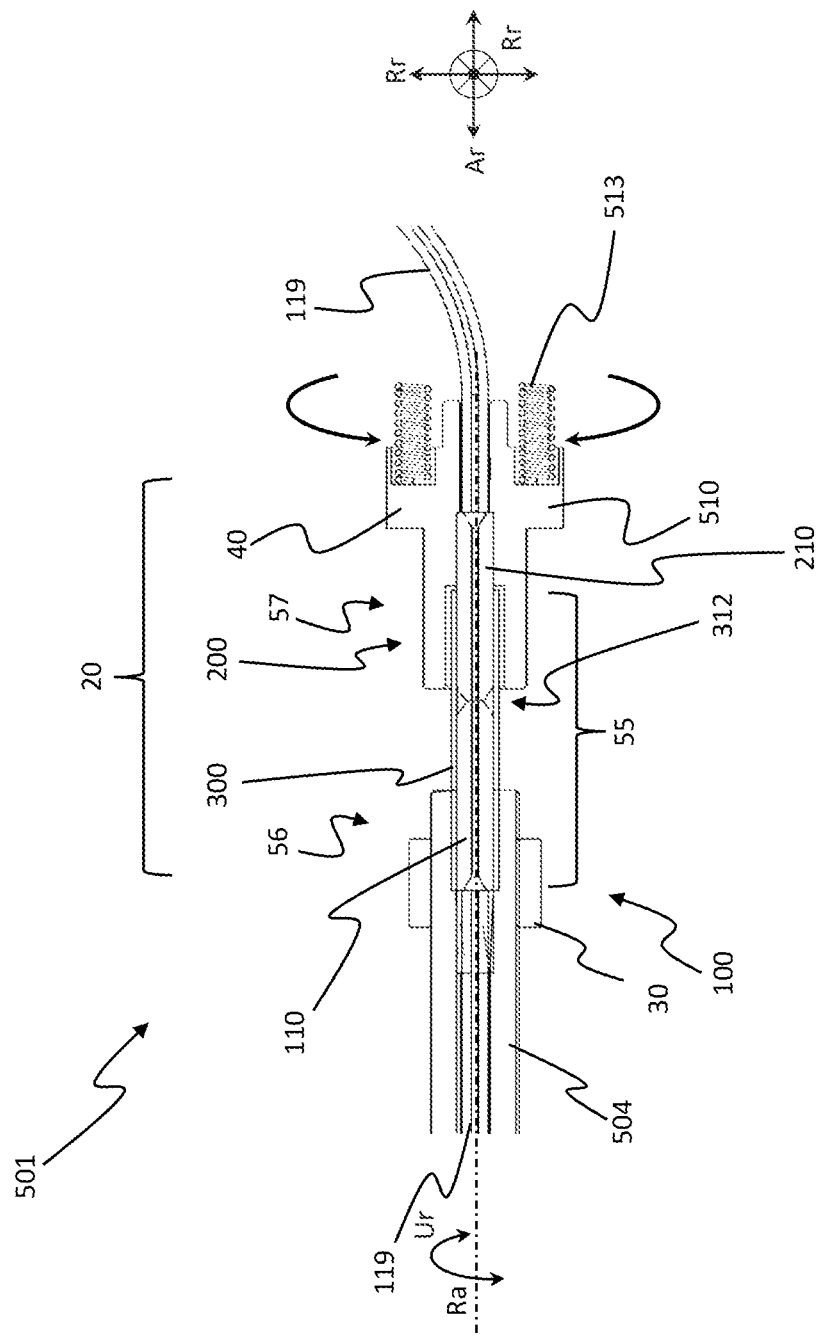
FIG. 6 shows the rotation transfer device of FIG. 3 in a radial and detail view broken away on both longitudinal sides.

In the following, with reference to FIG. 6, an enlarged embodiment of the first optical rotation transfer device 501 from FIG. 3 is explained in more detail, which builds on the general form of the first optical rotation transfer device 501 shown in FIG. 4 and FIG. 5. FIG. 6 also shows the polar coordinate system of FIG. 3 with the axial direction Ar, the radial direction Rr, the circumferential direction Ur, and the associated rotation axis Ra to indicate the orientation of the individual components.

The first optical rotation transfer device 501 is set up in the mechanical interface 20 between two active arm modules 5, where it has constituted the optomechanical rotation interface 55. On the one hand, the mechanical interface 20 comprises the rotatable first connection device 30 of the one active arm module 5. On the other hand, the mechanical interface 20 comprises the housing-fixed second connection device 40 of the further active arm module 5.

The first optical rotation transfer device 501 comprises the first interface side 56 with the rotary plug-in device 100 provided there on the first connection device 30 which may be rotated with respect to the one active arm module 5. Opposite in the axial direction Ar, the first optical rotation transfer device 501 has the rotary mating plug-in device 200 on the second connection device 40 which is fixed to the housing with respect to the further active arm module 5. The further active arm module 5 is thereby rotatable by the active arm module 5.

The rotary plug-in device 100 radially inwardly comprises a first ferrule 110 with the optical waveguide 119 of the one active arm module 5 mechanically and optically connected thereto. Radially outwardly on an outer circumferential edge of the first ferrule 110, a radial bearing sleeve 300 is arranged to form the radial plain bearing. Here, the radial bearing sleeve 300 is seated on the first ferrule 110 with a bonded first longitudinal end portion and protrudes from a free longitudinal end of the first ferrule 110 with a free second longitudinal end portion in an axial direction Ar.

The radial bearing sleeve 300 is provided, particularly in a fixed manner, together with the first ferrule 110 in a first receptacle 504 of the rotatable first connection device 30. The first receptacle 504 may e.g. be embodied, for example, as a tube, a sleeve, etc. Presently, the first receptacle 504 is in particular formed as a brass tube. The first receptacle 504 may comprise e.g. a bore, and/or a device for fastening the optical waveguide 119, the first ferrule 110 and/or the radial bearing sleeve 300.

The first receptacle 504 is preferably received within the output shaft 17. The first receptacle 504 may be provided in one piece or integral with the output shaft 17 or may be partially formed in one material piece or integral with the output shaft 17.

The rotary mating plug-in device 200 likewise radially inwardly comprises a second ferrule 210 with the optical waveguide 119 of the further active arm module 5 mechanically and optically connected thereto. The second ferrule 210 is set up in a second receptacle 510 of the second connection device 40 of the further active arm module 5 fixed to the housing, a portion of the second ferrule 210 facing away from a free longitudinal end of the second ferrule 210 being provided, in particular in a fixed manner, in the second receptacle 510 in the axial direction Ar (to the right with reference to FIG. 6). A portion of the second ferrule 210 projecting in the other axial direction Ar (to the left with reference to FIG. 6) with the free longitudinal end of the second ferrule 210 is embodied externally as a plain bearing shell for the radially inner surface of the radial bearing sleeve 300.

A portion of the second ferrule 210 extending from the free longitudinal end of the second ferrule 210 is disposed within the second receptacle 510 and is provided at a full radial distance from the second receptacle 510. That is, the second receptacle 510 is correspondingly recessed. The recess between the section of the second ferrule 210 and the second receptacle 510 is preferably embodied in a hollow-cylindrical manner and serves to receive the second free longitudinal end section of the radial bearing sleeve 300 projecting away from the first ferrule 110 in the axial direction Ar. The portion of the second ferrule 210 with the free longitudinal end externally serves as a plain bearing shell for the radially inner surface of the second free longitudinal end section of the radial bearing sleeve 300.

The second ferrule 210 is set up in a stationary manner at/in the further active arm module 5 relative to the housing 10 via the second receptacle 510 of the second connection device 40 fixed to the housing. The second receptacle 510 may comprise a device, e.g. a bore, and/or a device for fastening the optical waveguide 119 and/or the second ferrule 210.

It is preferred that the second receptacle 510 is mechanically biased against the first receptacle 504 by one or more springs 513. Instead of a spring 513, an elastic element may be used, as well. In time after plugging of the rotational interface 55 or the active arm modules 5, that is, when the first optical rotation transfer device 501 is set up, the gap 312 is preferably set up between the two longitudinal end portions of the first ferrule 110 and the second ferrule 210 provided in the radial bearing sleeve 300, so that the two free longitudinal ends of the ferrules are not in a mechanical rotational slip contact. The gap 312 is preferably arranged as a fluid gap, in particular as an air gap. The gap may be secured in various ways between the longitudinal end portions of the ferrules within the radial bearing sleeve 300.

The gap 312 may e.g. be ensured via the positions of the ferrules in the rotatable first connection device 30 and in the second connection device 40 fixed to the housing, the positions of which must in turn be ensured relative to the housing concerned. Furthermore, for this purpose e.g. an axially mutually mounted, e.g. slide-mounted, seating of the receptacles is possible. Furthermore, the gap 312 may be realized by the mechanical interface 20, which is embodied and may be set up in such a way that the gap 312 is set up when the first optical rotation transfer device 501 is embodied in a certain way.

The rotatable first connection device 30 of the one active arm module 5 (left in FIG. 6) may rotatably drive the second connection device 40, fixed to the housing, of the further active arm module 5 (right in FIG. 6). That is, the further active arm module 5 is set up rotatably in the robot arm with respect to the one active arm module 5. Here, the one active arm module 5 may be mechanically, optically, electrically and/or fluidically connected to a preceding (proximal) arm module. This preceding arm module may be embodied as an active or passive arm module.

In the embodiment of the first optical rotation transfer device 501 described with reference to FIG. 6, the rotation interface 55 is formed as a portion of the mechanical interface 20 between two active arm modules 5. It is possible to form the rotational interface 55 without such a mechanical interface 20 or to provide the mechanical interface 20 apart from one, i.e. as an offset arrangement of the rotational interface 55 with respect to the actual mechanical interface 20.

Figure 7:
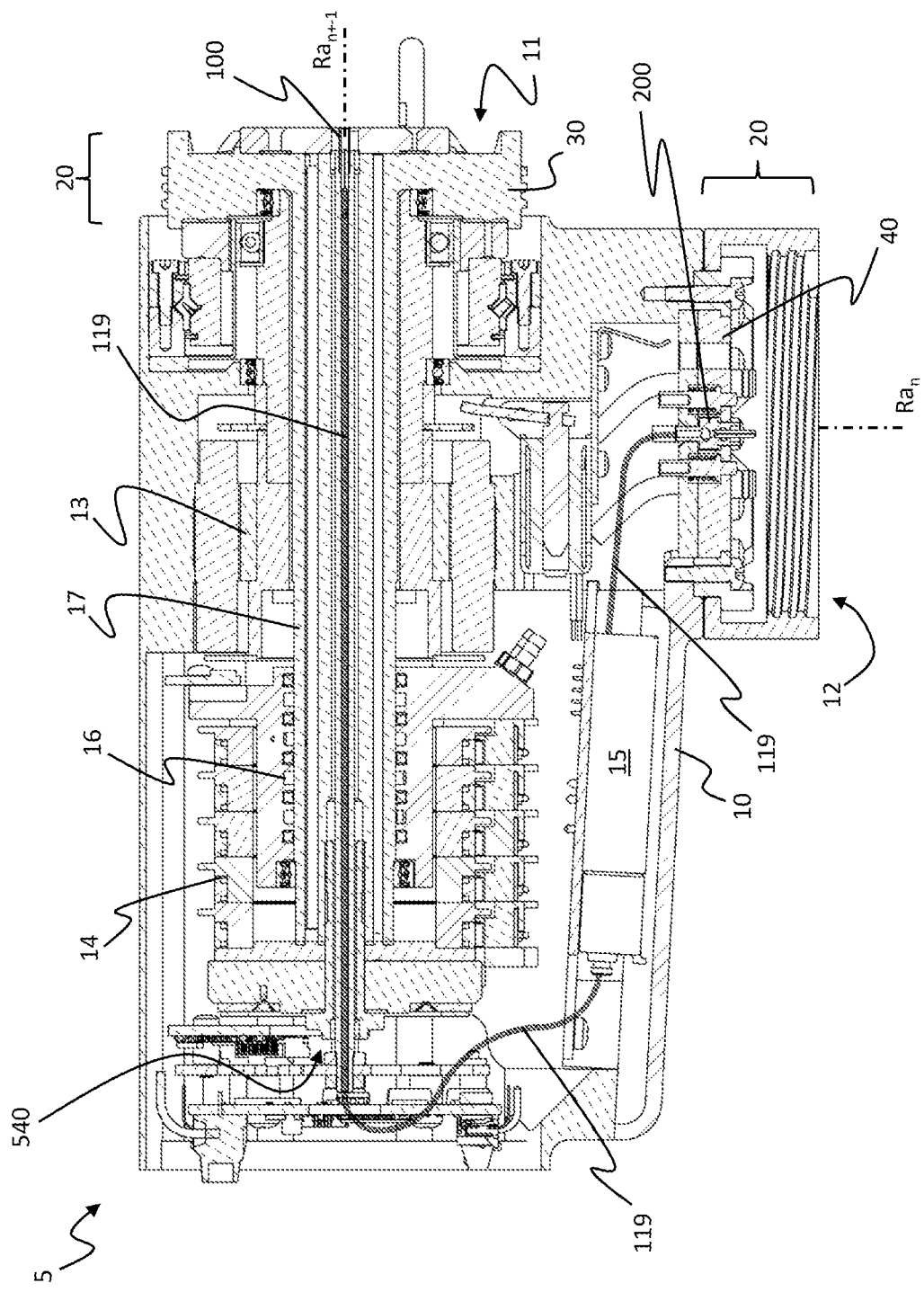
FIG. 7 shows a central section of a two-dimensional side view of an active arm module from FIG. 3.

FIG. 7 shows a centrally sectional, two-dimensional side view of an active arm module 5 from FIG. 3 in a modified embodiment. The active arm module 5 in FIG. 7 is essentially identical in structure to an active arm module 5 in FIG. 3, which is why the same reference numerals are used for the components of the arm module in FIG. 7.

The arm module 5 in the modified embodiment shown in FIG. 7 comprises a housing 10 without an end cap. Optical data transmission in the housing 10 of the active arm module 5 takes place from the rotary plug-in device 100 via the optical waveguide 119, which runs in the output shaft 17 and leads out of the output shaft 17 by to the transceiver 15 of an optical waveguide guide 540. From the transceiver 15, the optical data transmission then continues via the optical waveguide 119 to the rotary mating plug-in device 200. Of course, the optical data transmission may also take place bidirectionally, as well as in the other direction starting from the rotary mating plug-in device 200, via the optical waveguide 119, the transceiver 15, the optical waveguide 119 to the rotary plug-in device 100.

Figure 8:
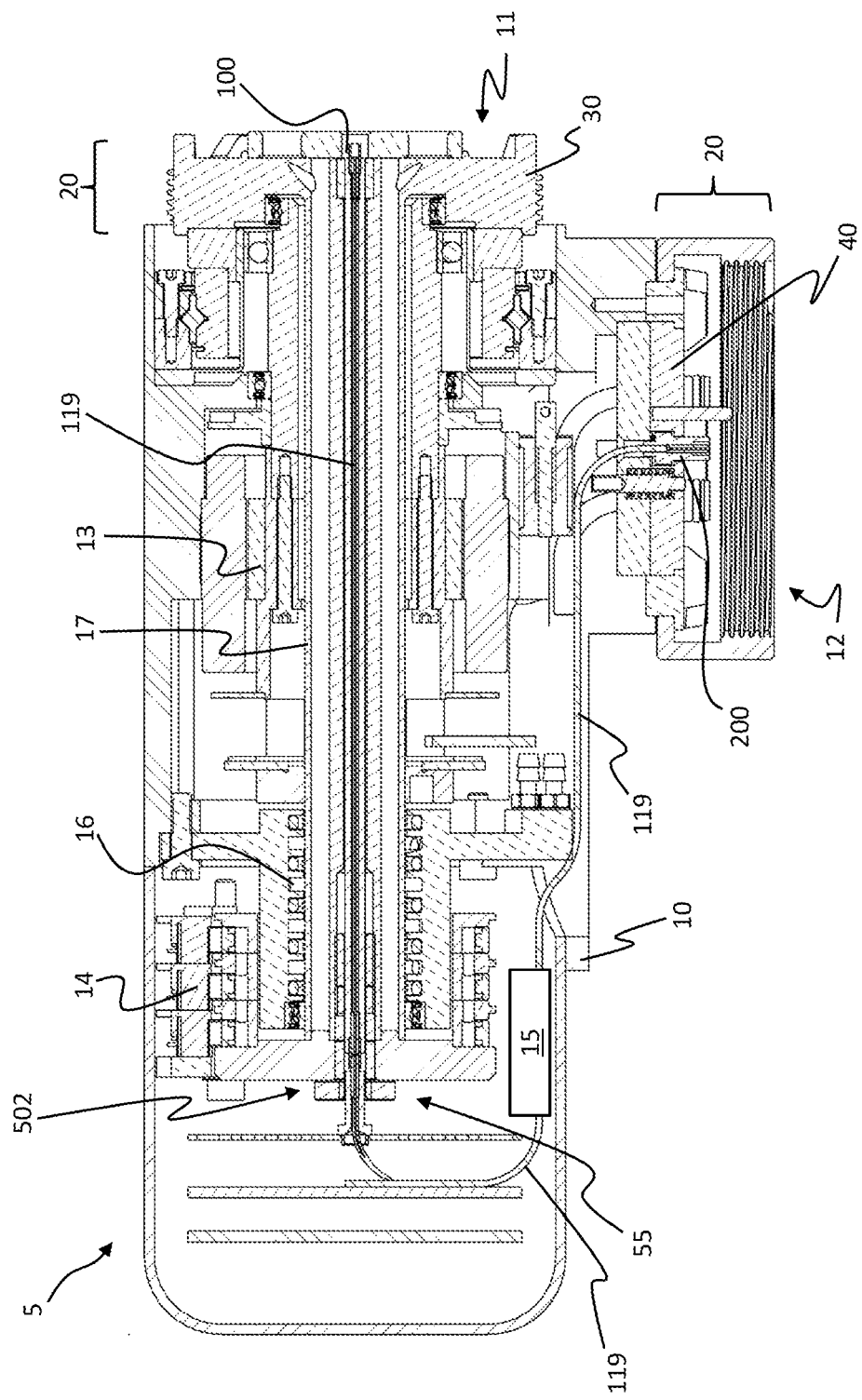
FIG. 8 shows a central section of a two-dimensional side view of an active arm module of the industrial robot of FIG. 1, with a second embodiment of an optical rotation transfer device.

FIG. 8 shows a centrally sectional, two-dimensional side view of an active arm module 5 of the industrial robot according to FIG. 1, which is alternative to FIG. 3 or FIG. 7, with a second embodiment of the rotation transfer device. The active arm module 5 shown in FIG. 8 has an essentially identical structure to the two active arm modules 5 in FIG. 3 or the active arm module in FIG. 7, which is why the same reference numerals are used for the components. The arm module 5 in the modified embodiment shown in FIG. 8 has a modified outer shape of the housing 10.

In the active arm module 5 shown in FIG. 8, in contrast to the embodiment in FIG. 3, a second rotation transfer device 502 is provided, which is set up remote from the mechanical interface 20 in the individual active arm module 5 and there constitutes an optomechanical rotation interface 55 there. Here, the rotation interface 55 is not part of the mechanical interface 20.

The optical waveguide guide of the active arm module in FIG. 8 is configured such that the optical waveguide 119 connects the first and second connection sides 11, 12 within the housing 10 to the transceiver 15 via the second rotation transfer device 502. The optical data transmission in the housing 10 of the active arm module 5 takes place from the rotary plug-in device 100 via the optical waveguide 119, which runs in the output shaft 17, to the second rotation transfer device 502. From the second rotation transfer device 502, the optical data transmission then takes place further via the optical waveguide 119 to the transceiver 15 and from there via the optical waveguide 119 to the rotary mating plug-in device 200. The optical data transmission may take place bidirectionally.

Figure 9:
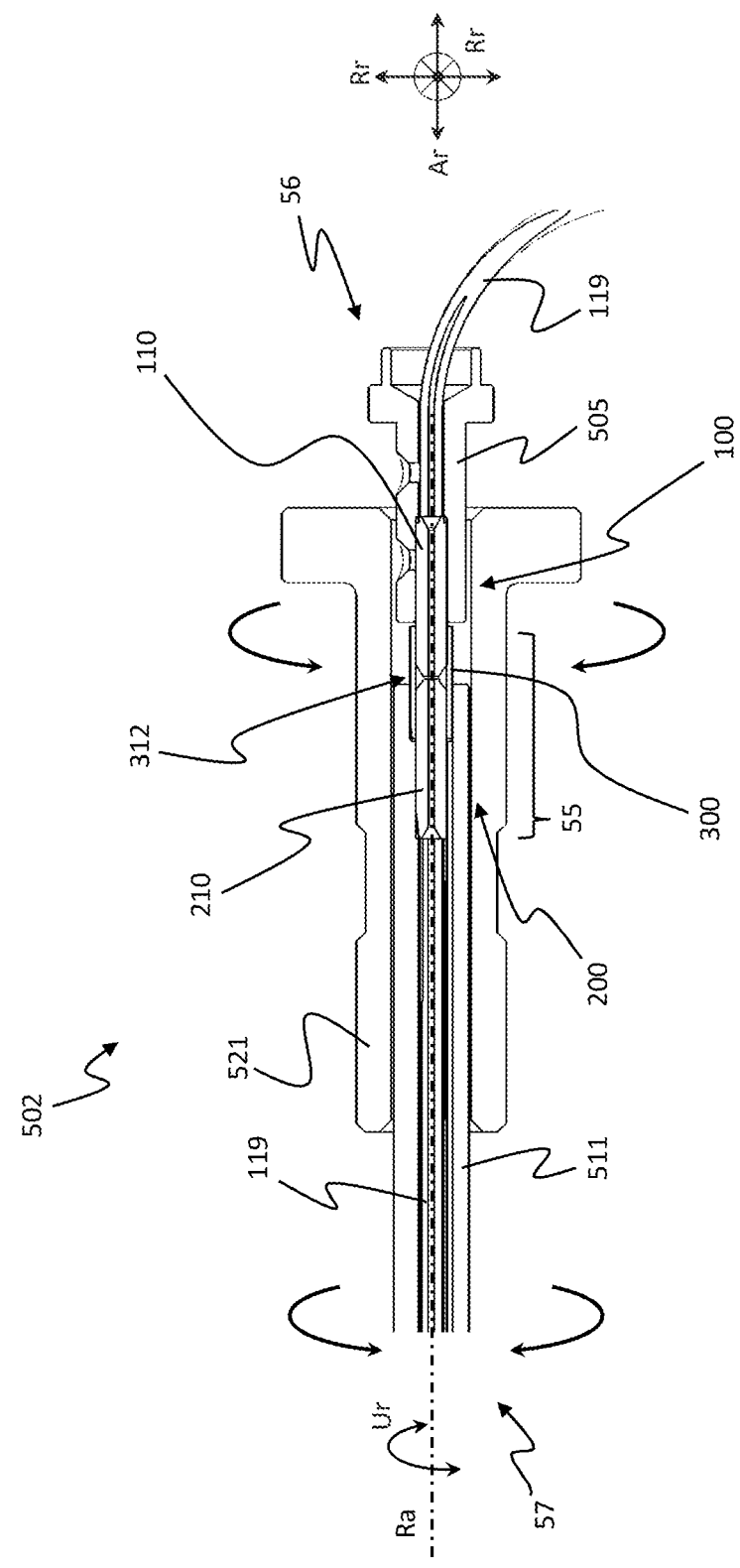
FIG. 9 shows the rotation transfer device of FIG. 8 in a radial and detail view broken away on both longitudinal sides.

In the following, with reference to FIG. 9, an enlarged embodiment of the second optical rotation transfer device 502 of FIG. 8, which is rotated by 180° relative to the embodiment shown in FIG. 8, is described in more detail, building on the general form of the first optical rotation transfer device 501 shown in FIG. 4 and FIG. 5. The embodiment of the second optical rotation transfer device 502 of FIG. 9 is partially kinematically reversed from the embodiment of the first optical rotation transfer device 501 in FIG. 6.

On its stator side (right in FIG. 9), the second rotation transfer device 502 comprises the first optomechanical interface side 56 with the rotary plug-in device 100 provided there. Opposite in axial direction Ar, the second rotation transfer device 502 comprises the second optomechanical interface side 57 with the rotary mating plug-in device 200 on its rotor side (left in FIG. 9).

The rotary plug-in device 100 radially internally comprises the first optical ferrule 110 with the optical waveguide 119 mechanically and optically connected thereto. The first ferrule 110 is set up in a first receptacle 505, wherein a longitudinal end section of the first ferrule 110 facing away from a free longitudinal end in the axial direction Ar (to the right with reference to FIG. 9) is provided, particularly in a fixed manner, in the first receptacle 505. A portion of the first ferrule 110 extending in the axial direction Ar (to the left in FIG. 9) and facing the free longitudinal end externally serves as a plain bearing shell for a radially inner surface of the radial bearing sleeve 300.

In this case, the radial bearing sleeve 300 formed as a radial plain bearing is radially outwardly arranged on an outer peripheral edge of the first ferrule 110. Here, the radial bearing sleeve 300 is seated on a second ferrule 210 only with a bound longitudinal end portion and protrudes from a free longitudinal end of the first ferrule 110 in the axial direction Ar (to the right with reference to FIG. 9).

The radial bearing sleeve 300 is received, particularly in a fixed manner, in a second receptacle 511 together with a second portion of the second ferrule 210 extending therefrom in the axial direction Ar (to the left with reference to FIG. 9). The second receptacle 511 may e.g. be formed as a tube, a sleeve, etc. In the present case, the second receptacle 511 is particularly embodied as a brass tube. The second receptacle 511 is preferably received internally in the output shaft 17 so as to be rotatable together with the output shaft 17; that is, the first ferrule 1110 and the radial bearing sleeve 300 are fixedly installed in the arm module 5 relative to the housing.

Here, the second receptacle 511 may be received within a central through recess of a bearing sleeve 521 which rotatably supports the second receptacle 511 within the output shaft 17. In a region of a free end of the output shaft 17 within the inner housing, i.e. remote from the rotatable first connection device 30, the bearing sleeve 521 may protrude from the output shaft 17 and inwardly into the housing 10. Furthermore, the second receptacle 511 may extend essentially through the output shaft 17 and have a preferably rotationally fixed optical further contact preferably arranged in a torque-proof manner at an end adjacent to the rotatable connection device 30.

The second receptacle 511 may include a bore and/or a device for fixing the optical waveguide 119 of the second ferrule 210 and/or the radial bearing sleeve 300. Further, as the case may be, an outer peripheral edge of the second ferrule 210 radially within the radial bearing sleeve 300 may also function as a plain bearing shell. In such a case, the radial bearing sleeve 300 may be arranged to rotate relative to the first ferrule 110. It is possible to provide the radial bearing sleeve 300 analogously on the axially opposite first ferrule 110.

A free longitudinal end section of the first ferrule 110 extending from the free longitudinal end of the first ferrule 110 and, as the case may be, a longitudinal section of the first receptacle 505 adjoining the free longitudinal end section may be advanced into the central through recess of the bearing sleeve 521 for setting up the second optical rotation transfer device 502 at the front face remote from the rotatable connection device. Here, in particular, the longitudinal end portion of the first receptacle 505 may be received or mounted, in particular slide-mounted, in the through recess of the bearing sleeve 521.

For setting up the second optical rotation transfer device 502, the free longitudinal end of the first ferrule 110 is preferably advanced into the through recess of the bearing sleeve 521 with the adjoining longitudinal end section of the first receptacle 505. The bearing sleeve 521 is thereby preferably already located in the output shaft 17. Here, first the free longitudinal end of the first ferrule 110 comes into mechanical contact with the radial bearing sleeve 300, the free longitudinal end being centered therein. The first ferrule 110 is then moved forward into the radial bearing sleeve 300 via the first receptacle 505 until a desired gap 312 is established.

The gap 312 is preferably again arranged as a fluid gap, in particular an air gap. The gap 312 may be secured in various ways between the longitudinal end portions of the ferrules within the radial bearing sleeve 300. The gap 312 may e.g. be secured via the positions of the ferrules in the receptacles, the positions of which must in turn be secured relative to the housing. The first receptacle 505 may be mechanically biased against the second receptacle 511, e.g. by a spring.

Figure 10:
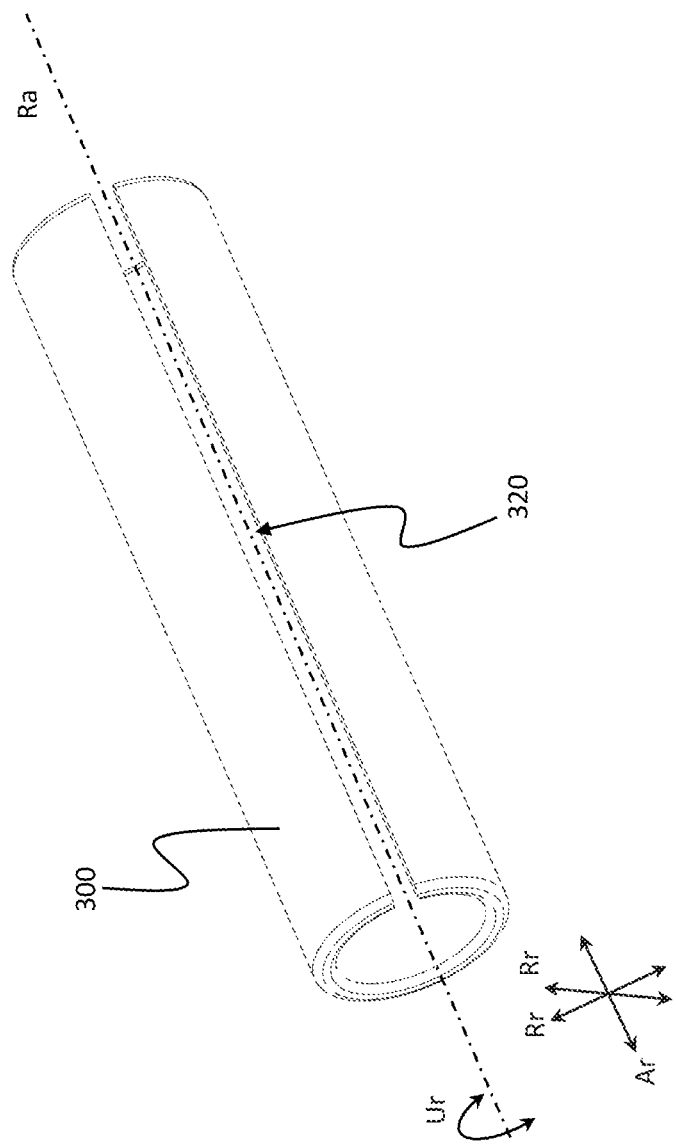
FIG. 10 shows a perspective view of an embodiment of a radial bearing sleeve for the rotation transfer device.

FIG. 10 shows an embodiment of a radial bearing sleeve 300, such as may be used with the rotation transfer devices 501 and 502 shown in FIG. 6 and FIG. 9, respectively. The radial bearing sleeve 300 has a substantially hollow-cylindrical shape, with an inner wall of the radial bearing sleeve 300 serving as a sliding surface.

A wall of the radial bearing sleeve 300 comprises a longitudinal through slot 320 extending completely through it in the axial direction Ar of the radial bearing sleeve. That is, the radial bearing sleeve 300 is not completely closed at any axial position around its circumference thereat. The longitudinal through slot 320 provides a certain resilience of the radial bearing sleeve 300 in the circumferential direction Ur and/or serves a tolerance compensation by the radial bearing sleeve 300. It is also possible in an alternative embodiment to omit the longitudinal through slot 320.

It is also possible to use other radial bearing sleeves. In this case, it is preferred that an inner sliding surface is essentially cylindrical, possibly cylindrical in a stepped manner. In the case of a stepped shape, the inner cylinders constituting the stepped shape are arranged concentrically in the radial bearing sleeve. An outer shape of the radial bearing sleeve is secondary in relation to its inner shape. In other words, the radial bearing sleeve may deviate from a cylindrical shape. This makes it e.g. possible to code the radial bearing sleeve.

Figure 11:
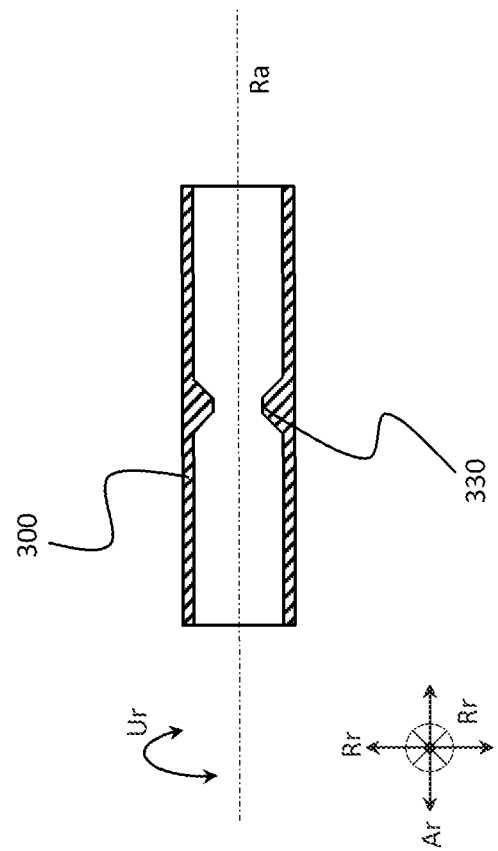
FIG. 11 shows a central section of a two-dimensional view of the radial bearing sleeve from FIG. 10.

FIG. 11 shows a cross-sectional view of the radial bearing sleeve 300 shown in FIG. 10. The radial bearing sleeve 300 has an inner circumferential collar 330 as an axial stop for a ferrule or for both ferrules. That is, in the set-up optical rotation transfer device 501 or 502, one ferrule or both ferrules may be axially seated against the inner circumferential collar 330. Here, the ferrule in question may be mechanically biased against the inner circumferential collar 330 by a mechanical spring. The inner circumferential collar 330 may be completely or only partially circumferential.

Figure 12:
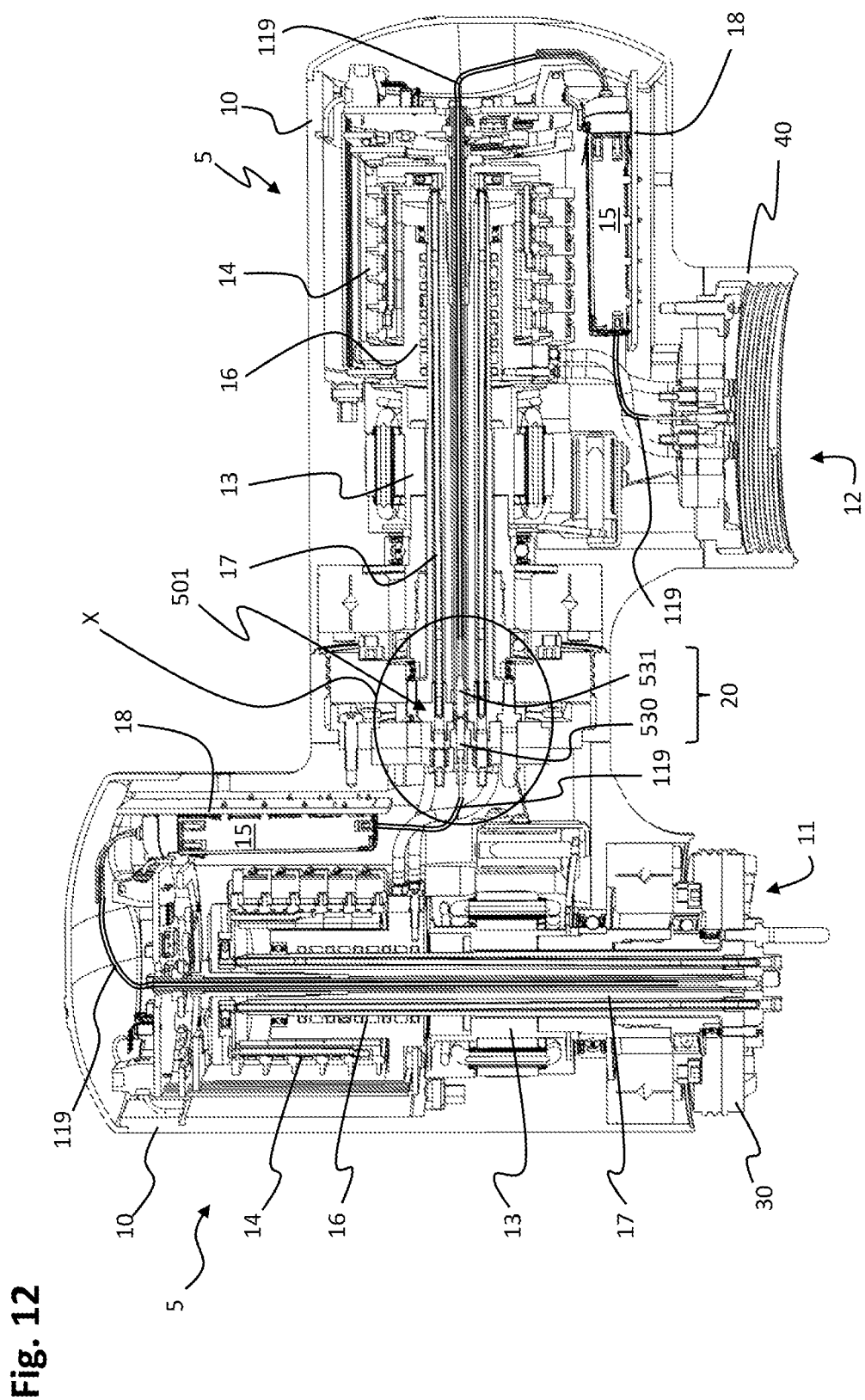
FIG. 12 shows a central section of a two-dimensional side view of two interconnected active arm modules of the industrial robot according to FIG. 1, comprising a third embodiment of an optical rotation transfer device.

FIG. 12 shows center-sectional, two-dimensional side view of two interconnected active arm modules 5 of the industrial robot according to FIG. 1 with a third embodiment. The active arm modules 5 shown in FIG. 12 are essentially identical to the two active arm modules 5 of FIG. 3, which is why the same reference numerals are used for the components. In the setup shown in FIG. 12, a modified embodiment of the first optical rotation transfer device 501 is used compared to the setup shown in FIG. 3.

Figure 13:
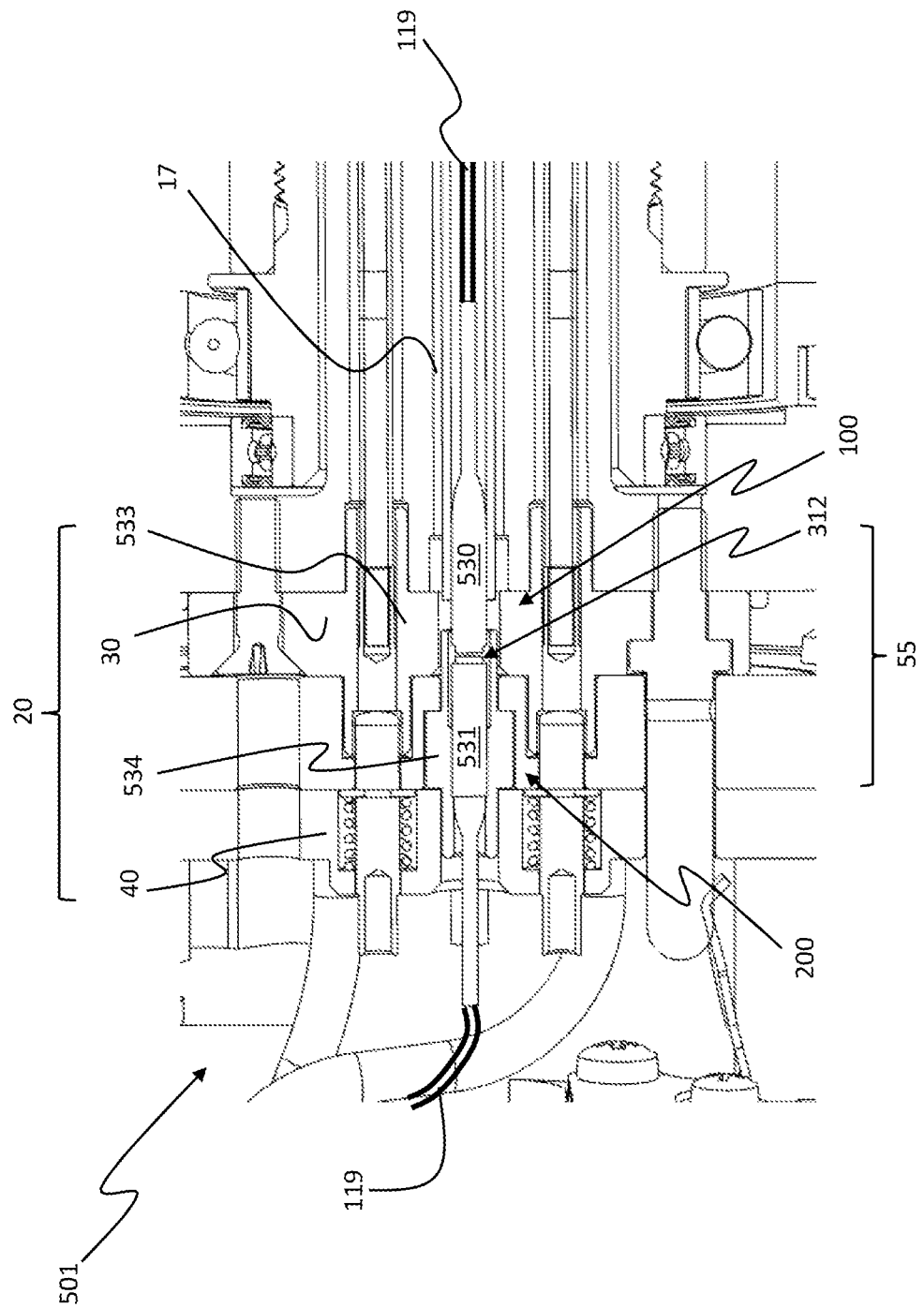
FIG. 13 shows an enlarged view of area X from FIG. 12.

FIG. 13 shows an enlarged detailed view X of the modified embodiment of the first optical rotation transfer device 501 according to FIG. 12.

In the modified embodiment of the first optical rotation transfer device 501, lenses are used instead of ferrules, as shown in FIG. 12 and in greater detail in FIG. 13. The modified embodiment of the first optical rotation transfer device 501 in FIG. 12 and FIG. 13 corresponds to the generic form of the first optical rotation transfer device 501, which is described in more detail with reference to FIG. 4. In principle, the modified embodiment of the first optical rotation transfer device 501 in FIG. 12 and FIG. 13 also corresponds to the embodiment of the optical rotation transfer device shown in FIG. 5.

As shown in FIG. 12 and FIG. 13, the modified embodiment of the first optical rotation transfer device 501 is set up in the mechanical interface 20 between two active arm modules 5, where it forms the optomechanical rotation interface 55. The mechanical interface 20 comprises, on the one hand, the rotatable first connection device 30 of the one active arm module 5 (right arm module in FIG. 12) and the housed second connection device 40 of the further active arm module 5 (left arm module in FIG. 12).

The first optical rotation transfer device 501 comprises, with respect to the one active arm module 5 on the rotatable first connector device 30, the rotary plug-in device 100 and, with respect to the other active arm module 5 on the second connector device 40 fixed to the housing, the rotary mating plug-in device 200.

The rotary plug-in device 100 radially inwardly comprises a first lens 530 having the optical waveguide 119 of the one active arm module 5 mechanically and optically connected thereto. Radially outwardly on an outer peripheral edge of the first lens 110, a first lens receptacle 533 is provided. The first lens receptacle 533 is fixed to the rear portion of the first lens 530 with a bonded first section. A hollow cylindrical engagement space is formed between a second portion of the first lens receptacle 533 adjacent to the first portion and the front portion of the first lens 530. The second portion of the first lens receptacle 533 thereby protrudes beyond the surface of the second lens 530 in the axial direction.

The first lens receptacle 533 is further connected to the output shaft 17 in a torque-proof manner. The first lens receptacle 533 may be provided in one piece or integral with the output shaft 17, or may be partially formed in one material piece or integral with the output shaft 17.

The rotary mating plug-in device 200 radially inwardly comprises a second lens 531 having the optical waveguide 119 of the further active arm module 5 mechanically and optically connected thereto. Radially outwardly on an outer peripheral edge of the second lens 531, a second lens receptacle 534 having a bound first portion is seated on the rear portion of the second lens 531. Adjacent to the first portion of the second lens receptacle 534 is a free second portion projecting from the surface of the second lens 531 in the axial direction.

The free second portion of the second lens receptacle 534 is cylindrical in shape and, in case of the arm modules 5 being assembled, when the rotatable first connector 30 and the housing-fixed second connector 40 are arranged on top of each other and assembled in the manner explained in connection with FIG. 3, engages the hollow cylindrical engagement space embodied between the second portion of the first lens receptacle 533 and the front part of the first lens 530. In this regard, the second portion of the first lens receptacle 533, with the inner surface forming the hollow-cylindrical engagement space, serves as a plain bearing shell for the radially outer surface of the second portion of the second lens receptacle 534.

In the variant of the first optical rotation transfer device 501 shown in FIG. 12 and FIG. 13, the optical signal is transmitted from the optical waveguide 119 of the active arm module 5 via the first lens 350 of the active arm module 5, the air gap 312 between the first lens 350 of the active arm module 5 and the second lens 351 of the further active arm module 5, the second lens 531 of the further active arm module 5 to the optical waveguide 119 of the further active arm module 5.

The use of a lens system, as in the setup in FIG. 12 and FIG. 13, has the advantage over the setup with a ferrule system shown in FIG. 3 that optical signal transmission using lenses does not require such precise alignment of the lenses with respect to each other compared to the ferrules, which is why a radial bearing embodiment using the lens receptacles without an additional radial bearing sleeve is sufficient.

The variant of the first rotation transfer device 501 shown in FIG. 12 and FIG. 13 may also be applied to the second rotation transfer device 502 shown in FIG. 8 and FIG. 9, in which the second rotation transfer device 502 is set up remote from the mechanical interface 20 in the single active arm module 5, where it constitutes an optomechanical rotation interface 55.

According to the invention, an optical high-speed signal transmission is realized between two arm modules of an industrial robot which are rotatable relative to each other. The arm modules are connected to each other via pluggable and/or screwable connections with corresponding contacts in a mechanical interface. The components of the optical rotation transfer device for signal transmission are therefore pluggable. An achievable data rate of the signal transmission, e.g. for an EtherCAT connection or a Gigabit Ethernet connection, is at least 1.1 Gbit/s. The solution is robust and may maintain its functionality in an industrial environment. A real-time capability, e.g. of EtherCAT, is not affected.

Furthermore, a simple and low-cost structure for the rotation transfer device is realized, wherein a sliding friction contact is set up.

Compared with conventional rotation transmitters, significant cost savings may be achieved, especially in terms of material costs. Furthermore, there is a considerably smaller geometric cross-section and a considerably smaller volume for a rotation transfer device, so that an optical rotation transfer may e.g. be installed in a 3 mm bushing, e.g. of the output shaft.

The invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

| List of Reference Numerals: 1-404 |
|---|
| 1 robot base |
| 2 robot arm |
| 5 active arm module |
| 5.1 first active arm module |
| 5.2 second active arm module |
| 5.3 third active arm module |
| 5.4 fourth active arm module |
| 5.5 fifth active arm module |
| 5.6 sixth active arm module |
| 6 passive arm module |
| 6.1 first passive arm module |
| 6.2 second passive arm module |
| 7 distal robot arm end |
| 10 housing |
| 11 first connection side |

TABLE 1-continued

List of Reference Numerals: 1-404

12 second connection side
13 drive unit
14 slip ring device
15 transceiver
16 rotary feedthrough
17 output shaft
18 module control unit
19 shaft assembly
20 mechanical interface
30 first connection device
40 second connection device
55 rotation interface
56 first interface side
57 second interface side
100 rotary plug-in device
110 first ferrule
119 optical waveguide
200 rotary mating plug-in device
210 second ferrule
300 radial bearing sleeve
301 external thread
302 first spur toothing
303 centering pin
304 first contact device
312 gap
320 longitudinal through slot
330 inner circumferential collar
401 fastening ring
402 second spur toothing
403 centering receptacle
404 second contact device

TABLE 2

List of Reference Numerals: 502-540

502 second optical rotation transfer device
504 first receptacle (first optical rotation transfer device)
505 first receptacle (second optical rotation transfer device)
510 second receptacle (first optical rotation transfer device)
511 second receptacle (second optical rotation transfer device)
513 spring
521 bearing sleeve
530 first lens
531 second lens
533 first lens receptacle
534 second lens receptacle
540 optical waveguide guide

The invention claimed is:

1. An industrial robot comprising:
a modular robot arm having a plurality of arm modules, wherein at least one arm module comprises a housing with a first connection side and a second connection side, wherein the first connection side is configured to be controllably rotatable relative to the second connection side about an axis of rotation,
wherein an optical rotation transfer device is arranged between the first connection side and the second connection side, which has an optomechanical rotation interface with a first interface side and a second interface side which face each other and are each formed essentially rotationally symmetrically and complementarily to each other, and
wherein the first interface side is connected to a first optical waveguide and the second interface side is connected to a second optical waveguide, the first optical waveguide and the second optical waveguide each being configured for guiding and transmitting optical signals;
wherein the first interface side has an optomechanical rotary plug-in device with a first optical device and the second interface side has an optomechanical rotary mating plug-in device with a second optical device, which are set up so as to be rotatable relative to one another and are mounted mechanically relative to one another with a radial plain bearing and a plain bearing shell complementary thereto, and
wherein the optomechanical rotary plug-in device and the optomechanical rotary mating plug-in device are formed as a cylindrical hollow system, wherein a gap is formed between the first optical device and the second optical device in the axial direction of the rotation transfer device, across which gap optical signal transmission of the optical signals takes place from the first optical waveguide to the second optical waveguide and vice-versa from the second optical waveguide to the first optical waveguide.

2. The industrial robot according to claim 1, wherein the mutually rotatable first and second interface sides of the optical rotation transfer device have a substantially fixed position in the axial direction, wherein the first interface side and the second interface side are mechanically biased against each other in the axial direction.

3. The industrial robot according to claim 1, wherein the rotary plug-in device comprises a first ferrule and the rotary mating plug-in device comprises a second ferrule, wherein the first ferrule and the second ferrule are each arranged rotatably relative to one another within a radial bearing sleeve at least in sections.

4. The industrial robot according to claim 1, wherein the rotary plug-in device comprises a first lens having a first lens receptacle and the rotary mating plug-in device comprises a second lens having a second lens receptacle, the first lens receptacle and the second lens receptacle forming the radial plain bearing and the complementary plain bearing shell.

5. The industrial robot according to claim 4,
wherein the first lens receptacle is arranged radially outwardly on an outer peripheral edge of the first lens, in the rotary mating device, the first lens receptacle is fixed with a bonded first portion on a rear part of the first lens, and a hollow-cylindrical engagement space is configured between a second portion of the first lens receptacle adjacent to the first portion and the front part of the first lens, and
in the rotary mating plug-in device, radially outwardly on an outer peripheral edge of the second lens, the second lens receptacle is seated with a bound first portion on the rear part of the second lens and protrudes with a free second portion of the second lens receptacle adjoining the first portion from the second lens in the axial direction,
wherein the free second portion of the second lens receptacle is cylindrical in shape and engages the hollow cylindrical engagement space formed between the second portion of the first lens receptacle and the front part of the first lens.

6. The industrial robot according to claim 1, wherein the first connection side may be rotated about the axis of rotation and the second connection side is set up in a torque-proof manner.

7. The industrial robot according to claim 6, wherein a drive device is set up in the housing by which a rotatable connection device of the first connection side may be rotated, wherein the rotatable connection device is connected to an output shaft of the drive device extending into the housing in a torque-proof manner.

8. An industrial robot comprising:
a modular robot arm having a plurality of arm modules, a first and a second arm module each having a housing with a first connection side and a second connection side, the first connection side being configured to be controllably rotatable about a rotation axis relative to the second connection side,
wherein a first interface side of an optical rotation transfer device is arranged in the first connection side of the first arm module and a second interface side of the optical rotation transfer device is arranged in the second connection side of the second arm module,
wherein the first interface side and the second interface side face each other and are each formed substantially rotationally symmetrically and complementarily to each other, wherein the first interface side is connected to a first optical waveguide and the second interface side is connected to a second optical waveguide, the first optical waveguide and the second optical waveguide each being configured for guiding and transmitting optical signals,
wherein the first interface side has an optomechanical rotary plug-in device with a first optical device and the second interface side has an optomechanical rotary mating plug-in device with a second optical device, which are set up to be rotatable with respect to one another and are mounted with respect to one another mechanically with a radial plain bearing and a plain bearing shell complementary thereto, and
wherein the optomechanical rotary plug-in device and the optomechanical rotary mating plug-in device are formed as a cylindrical hollow system, wherein a gap is formed between the first optical device and the second optical device in the axial direction of the rotation transfer device, across which gap optical signal transmission of the optical signals takes place from the first optical waveguide to the second optical waveguide and vice versa from the second optical waveguide to the first optical waveguide.

9. The industrial robot according to claim 8, wherein the mutually rotatable first and second interface sides of the optical rotation transfer device have a substantially fixed position in the axial direction, wherein the first interface side and the second interface side are mechanically biased against each other in the axial direction.

10. The industrial robot according to claim 8, wherein the rotary plug-in device comprises a first ferrule and the rotary mating plug-in device comprises a second ferrule, wherein the first ferrule and the second ferrule are each arranged rotatably relative to one another within a radial bearing sleeve at least in sections.

11. The industrial robot according to claim 8, wherein the rotary plug-in device comprises a first lens having a first lens receptacle and the rotary mating plug-in device comprises a second lens having a second lens receptacle, the first lens receptacle and the second lens receptacle forming the radial plain bearing and the complementary plain bearing shell.

12. The industrial robot according to claim 11,
wherein the first lens receptacle is arranged radially outwardly on an outer peripheral edge of the first lens, in the rotary mating device, the first lens receptacle is fixed with a bonded first portion on a rear part of the first lens, and a hollow-cylindrical engagement space is configured between a second portion of the first lens receptacle adjacent to the first portion and the front part of the first lens,
wherein in the rotary mating plug-in device, radially outwardly on an outer peripheral edge of the second lens, the second lens receptacle is seated with a bound first portion on the rear part of the second lens and protrudes with a free second portion of the second lens receptacle adjoining the first portion from the second lens in the axial direction, and
wherein the free second portion of the second lens receptacle is cylindrical in shape and engages the hollow cylindrical engagement space formed between the second portion of the first lens receptacle and the front part of the first lens.

13. An industrial robot comprising:
a modular robot arm having a plurality of arm modules, wherein at least one arm module comprises a housing with a first connection side and a second connection side, wherein the first connection side is configured to be controllably rotatable relative to the second connection side about an axis of rotation,
wherein an optical rotation transfer device is arranged between the first connection side and the second connection side or a second connection side of a further arm module, which has an optomechanical rotation interface with a first interface side and a second interface side which face each other and are each formed essentially rotationally symmetrically and complementarily to each other,
wherein the first interface side has an optomechanical rotary plug-in device with a first optical device and the second interface side has an optomechanical rotary mating plug-in device with a second optical device, which are set up so as to be rotatable relative to one another and are mounted mechanically relative to one another with a radial plain bearing and a plain bearing shell complementary thereto,
wherein the optomechanical rotary plug-in device and the optomechanical rotary mating plug-in device are formed as a cylindrical hollow system, wherein a gap is formed between the first optical device and the second optical device in the axial direction of the rotation transfer device, across which gap an optical signal transmission takes place, and
wherein the rotary plug-in device comprises a first ferrule and the rotary mating plug-in device comprises a second ferrule, wherein the first ferrule is connected to a first optical waveguide and the second ferrule is connected to a second optical waveguide, the first optical waveguide and the second optical waveguide each being configured for guiding and transmitting optical signals, wherein the first ferrule and the second ferrule are each arranged rotatably relative to one another within a radial bearing sleeve at least in sections, wherein the radial bearing sleeve has an inner circumferential collar on which the first ferrule and/or the second ferrule may be axially seated.

14. The industrial robot according to claim 13, wherein the mutually rotatable first and second interface sides of the optical rotation transfer device have a substantially fixed position in the axial direction, wherein the first interface side and the second interface side are mechanically biased against each other in the axial direction.

15. The industrial robot according to claim 13, wherein the radial bearing sleeve has a longitudinal through slot passing completely through it in the axial direction of the rotation interface.

16. The industrial robot according to claim 13, wherein the rotary plug-in device comprises a first receptacle for the first ferrule and the rotary mating plug-in device comprises a second receptacle for the second ferrule, wherein the ferrules and the receptacles are each fixedly connected to each other.

17. The industrial robot according to claim 13, wherein the first connection side may be rotated about the axis of rotation and the second connection side is set up in a torque-proof manner.

18. The industrial robot according to claim 17, wherein a drive device is set up in the housing by which a rotatable connection device of the first connection side may be rotated, wherein the rotatable connection device is connected to an output shaft of the drive device extending into the housing in a torque-proof manner.

\* \* \* \* \*